(12) United States Patent
Morita

(10) Patent No.: US 10,147,359 B2
(45) Date of Patent: Dec. 4, 2018

(54) DISPLAY DRIVER, ELECTRO-OPTICAL DEVICE, AND ELECTRONIC APPARATUS

(71) Applicant: SEIKO EPSON CORPORATION, Tokyo (JP)

(72) Inventor: Akira Morita, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/665,704

(22) Filed: Aug. 1, 2017

(65) Prior Publication Data

US 2018/0047340 A1 Feb. 15, 2018

(30) Foreign Application Priority Data

Aug. 10, 2016 (JP) ................... 2016-157241

(51) Int. Cl.
| G09G 3/3258 | (2016.01) |
| G09G 3/3283 | (2016.01) |
| G09G 3/36 | (2006.01) |
| G06F 3/0481 | (2013.01) |
| G09G 3/20 | (2006.01) |
| G02F 1/00 | (2006.01) |

(52) U.S. Cl.
CPC ....... *G09G 3/3258* (2013.01); *G06F 3/04812* (2013.01); *G09G 3/2092* (2013.01); *G09G 3/3283* (2013.01); *G09G 3/3655* (2013.01); *G02F 1/0018* (2013.01); *G09G 2310/027* (2013.01); *G09G 2320/0223* (2013.01); *G09G 2320/0693* (2013.01); *G09G 2330/12* (2013.01)

(58) Field of Classification Search
CPC .. G09G 3/3258; G09G 3/3283; G09G 3/3655; G06F 3/04812
See application file for complete search history.

(56) References Cited

U.S. PATENT DOCUMENTS

| 6,011,533 | A | 1/2000 | Aoki | |
| 2010/0182300 | A1* | 7/2010 | Kato | G09G 3/3685 |
| | | | | 345/211 |
| 2012/0001055 | A1* | 1/2012 | Lee | H03K 4/08 |
| | | | | 250/208.1 |
| 2012/0044275 | A1 | 2/2012 | Kobayashi | |
| 2012/0139436 | A1* | 6/2012 | Park | G09G 3/3648 |
| | | | | 315/240 |
| 2016/0163285 | A1* | 6/2016 | Morita | G09G 3/3688 |
| | | | | 345/215 |
| 2016/0217759 | A1* | 7/2016 | Morita | G09G 3/20 |

FOREIGN PATENT DOCUMENTS

| JP | 2001-324970 A | 11/2001 |
| JP | 2010-276800 A | 12/2010 |
| JP | 2012-042611 A | 3/2012 |

* cited by examiner

*Primary Examiner* — Tri Hoang
(74) *Attorney, Agent, or Firm* — Oliff PLC

(57) ABSTRACT

A display driver includes a plurality of output terminals that output a plurality of data signals which are output to an electro-optical panel, a plurality of capacitance circuits that are respectively provided between adjacent output terminals of the plurality of output terminals, and a control circuit that sets capacitance values of each capacitance circuit.

15 Claims, 15 Drawing Sheets

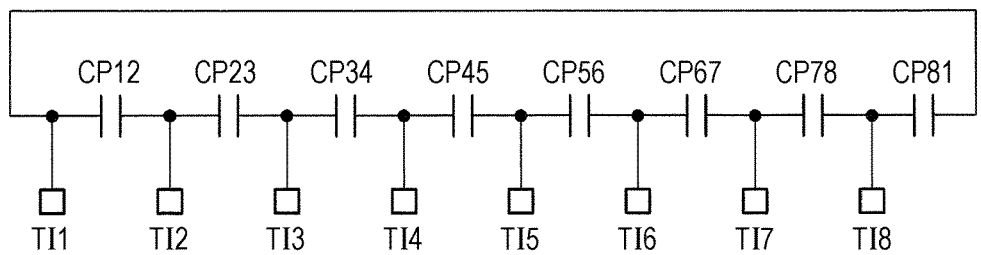

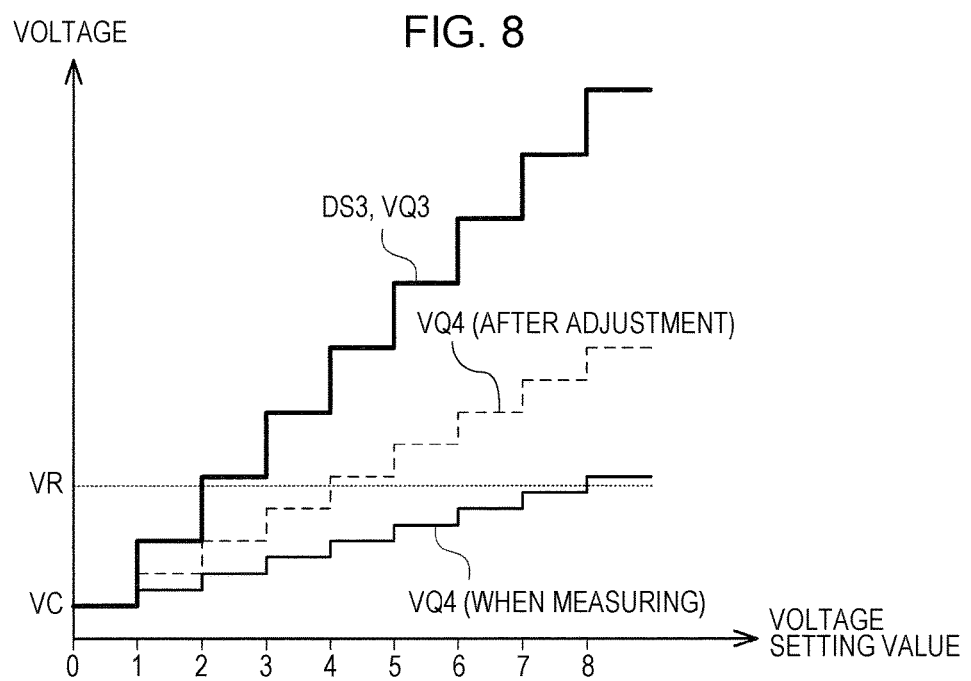
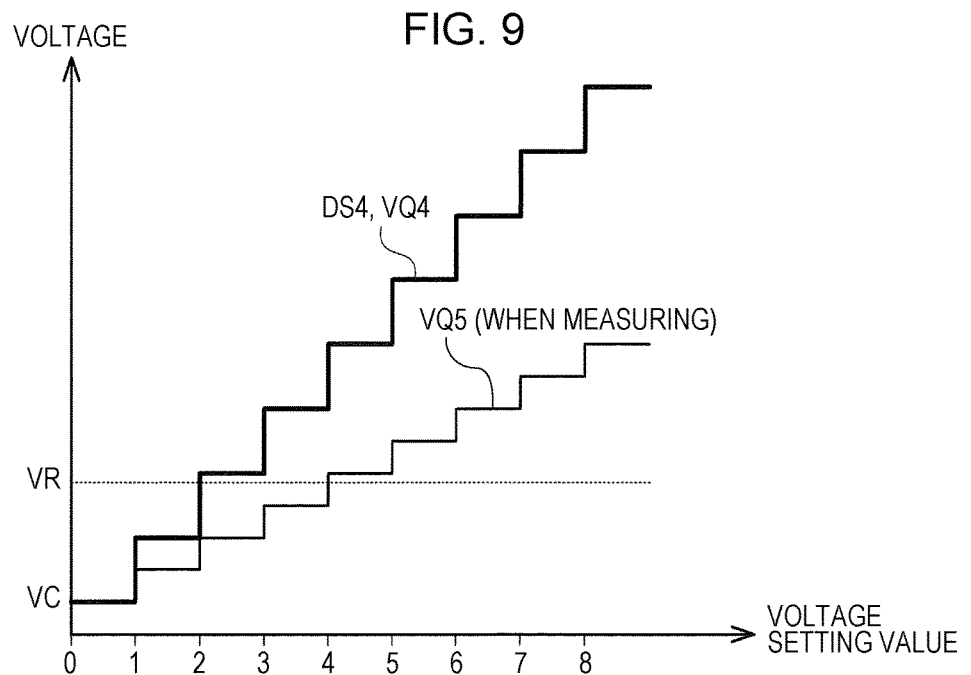

DISPLAY DRIVER, ELECTRO-OPTICAL DEVICE, AND ELECTRONIC APPARATUS

BACKGROUND

1. Technical Field

The present invention relates to a display driver, an electro-optical device, and an electronic apparatus.

2. Related Art

A display driver of the related art includes a D/A conversion circuit that converts display data of each pixel into a voltage, and an amplification circuit that drives each pixel using a data voltage on the basis of the voltage. Since the amplification circuit performs a feedback control, the data voltage can be controlled to a target voltage although capacitances (for example, parasitic capacitances between data lines) of each data line are different from each other.

Recently, drive time per pixel is shortened due to advancement of a high definition electro-optical panel. For example, several to dozen pixels are driven at a time during phase development drive (for example, JP-A-2001-324970) in which several to dozen source lines are sequentially driven, and thus, high definition is achieved and the drive time per pixel is significantly shortened. If the drive time is shortened as such, drive capability of the amplification circuit needs to increase (settling time is shortened), but if the drive capability of the amplification circuit increases, accuracy of an output voltage decreases relatively. In order to achieve both, it is necessary to increase current consumption of the amplification circuit, but heat generation (temperature increase) of the display driver increases, and thus, it is difficult to achieve a high definition.

In order to solve the above problem, a method of performing drive without using feedback control, and thereafter, being set to a data voltage with high accuracy by an amplification circuit (or a method of performing only drive without using feedback control) is considered. For example, there is a method (digital assistance drive) of rapidly changing a data voltage to a target voltage by connecting an output terminal to a power supply during a predetermined period by using a transistor with drive capability according to a gradation difference between previous display data and next display data. Alternatively, there is a method (capacitance drive) of rapidly changing the data voltage to the target voltage by performing charge redistribution of charge quantity according to display data, between capacitances of data lines or pixels and capacitances of a drive circuit.

However, since the methods do not perform feedback control, there is a problem in which, in a case where capacitances (for example, parasitic capacitances between data lines) between each data lines are different from each other, an error between a data voltage that actually reaches and a target voltage is caused by fluctuation of capacitances of each data line and display quality decreases (For example, display unevenness occurs). If an amplification circuit intends to correct the error between the data voltage and the target voltage, the amplification circuit requires drive capability for settling the data voltage in a short time, and as a result, power consumption of the amplification circuit increases.

In addition, since there is a case where a display driver is commonly used for various electro-optical panels, in a case where the display driver is used for various electro-optical panels, it is necessary to reduce display unevenness caused by fluctuation of capacitances between data lines.

SUMMARY

An advantage of some aspects of the invention is to provide a display driver, an electro-optical device, and an electronic apparatus which can reduce display unevenness caused by fluctuation of capacitances between data lines, depending on various electro-optical panel.

According to an aspect of the invention, there is provided a display driver that outputs a data voltage according to display data to an electro-optical panel, including a first drive circuit that outputs a first data voltage in accordance with first display data, a second drive circuit that outputs a second data voltage in accordance with second display data, a first output terminal that is electrically connected to a first data line of the electro-optical panel and outputs the first data voltage, a second output terminal that is electrically connected to a second data line of the electro-optical panel which is adjacent to the first data line and outputs the second data voltage, a variable capacitance circuit that is provided between the first output terminal and the second output terminal, and a control circuit that sets a capacitance value of the variable capacitance circuit.

According to the aspect of the invention, a capacitance circuit is provided between adjacent output terminals, and a capacitance value of a capacitance circuit is controlled. Thereby, a sum of capacitance values of parasitic capacitances between data lines in the electro-optical panel and a capacitance value of a capacitance circuit can be adjusted so as to be approximately the same in each data line. Since capacitances between the data lines are approximately the same in each data line, variation of a data voltage due to coupling of the capacitances are approximately uniform in each data line, and display unevenness can be reduced. Fluctuation of the parasitic capacitance between the data lines differs depending on a type of the electro-optical panel, but the aforementioned adjustment can be performed by a capacitance circuit of the display driver in the aspect of the invention, and thus, it is possible to reduce display unevenness caused by the fluctuation of the capacitance between the data lines, according to various electro-optical panels.

In addition, in the aspect of the invention, each capacitance circuit may include a capacitor group, and at least one switch group which connects each capacitor of the capacitor group to the output terminal.

According to the aspect of the invention, connections between each capacitor of a capacitor group and output terminals can be controlled by a switch group. Thereby, it possible to adjust capacitances between adjacent output terminals by using a capacitance circuit, and to equalize the capacitances between the data lines by correcting fluctuation of parasitic capacitances between the data lines.

In addition, in the aspect of the invention, each of the capacitance circuits may include at least one switch group of a first switch group having one terminal connected to an ith output terminal among a plurality of output terminals and the other terminal connected to one terminal of the capacitor group, and a second switch group having one terminal connected to an (i+1)th output terminal adjacent to the ith output terminal and the other terminal connected to the other terminal of the capacitor group.

According to the aspect of the invention, a capacitor group is connected to adjacent output terminals by a first switch group and a second switch group aside. Thereby, it is possible to control whether or not to connect each capacitor of the capacitor group between adjacent output terminals by controlling ON and OFF of each switch of the first and second switch groups.

In addition, in the aspect of the invention, the plurality of capacitance circuits may include a capacitance circuit provided between the nth output terminal and the first output terminal among the first to nth output terminals (n is an integer of 2 or more) which are the plurality of output terminals.

The electro-optical panel of a phase development type also includes a parasitic capacitance between the nth data line and the first data line, and the parasitic capacitance also causes display unevenness due to fluctuation of the parasitic capacitance between the data lines. In this regard, according to the aspect of the invention, a capacitance circuit is provided between the nth output terminal and the first output terminal, and thus, it is possible to adjust the capacitance between the nth data line and the first data line, and to reduce display unevenness.

In addition, in the aspect of the invention, the capacitance values of each capacitor of the capacitor group may be weighted by binary numbers.

By doing so, it is possible to adjust a capacitance value of a capacitance circuit by controlling a switch group of the capacitance circuit using binary codes corresponding to the capacitance values set in the capacitance circuit.

In addition, in the aspect of the invention, the control circuit may have a register that stores capacitance value setting information for setting capacitance values of each of the capacitance circuit.

According to the aspect of the invention, as a register that stores capacitance value setting information is included, capacitance values of a capacitance circuit can be variably adjusted by changing the capacitance value setting information. Thereby, it possible to adjust capacitances between data lines in correspondence with various electro-optical panels having different parasitic capacitances between the data lines.

In addition, in the aspect of the invention, a measurement circuit which measures capacitance value information between a plurality of data lines of the electro-optical panel may be included, and capacitance values of each of the capacitance circuits may be set on the basis of the capacitance value information measured by the measurement circuit.

According to the aspect of the invention, by measuring the capacitance value information between the data lines, the capacitance values of the capacitance circuit can be adjusted such that capacitances between the data lines are the same, based on the capacitance value information.

In addition, in the aspect of the invention, the measurement circuit may include a comparison circuit having a first input terminal to which a determination voltage is input; and a switch group which connects one output terminal of the plurality of output terminals to a second input terminal of the comparison circuit.

According to the aspect of the invention, any one output terminal is connected to the second input terminal of the comparison circuit by the switch group, and a voltage of the output terminal is compared with the determination voltage. Thereby, it is possible to compare voltage variation of the output terminal with the determination voltage, and to acquire the capacitance value information from the comparison results.

In addition, in the aspect of the invention, in a case where a voltage of the ith output terminal among the plurality of output terminals changes, the switch group may connect the (i+1)th output terminal adjacent to the ith output terminal to the second input terminal, and the comparison circuit may compare a voltage of the (i+1)th output terminal and the determination voltage.

According to the aspect of the invention, in a case where the voltage of the ith output terminal adjacent to the (i+1)th output terminal changes, voltage variation of the (i+1)th output terminal can be compared with the determination voltage by the comparison circuit. Since a magnitude of the voltage variation of the (i+1)th output terminal changes in accordance with the capacitance value of the parasitic capacitance between the adjacent data lines, it is possible to measure capacitance value information of the parasitic capacitance on the basis of the comparison results obtained by the comparison circuit.

In addition, in the aspect of the invention, a drive circuit that outputs the plurality of data signals to the plurality of output terminals may be included.

In a case where a drive circuit changes a voltage of a data signal, a voltage of an output terminal, which is adjacent to an output terminal, obtained by changing a voltage of the data signal varies due to coupling of parasitic capacitances between data lines. At this time, if the parasitic capacitances between the data lines fluctuate, voltage variation due to the coupling also fluctuates. In this regard, according to the aspect of the invention, capacitances between data lines can be adjusted by a capacitance circuit, and thus, it is possible to reduce fluctuation of voltage variation due to coupling. Thereby, it is possible to reduce display unevenness.

In addition, in the aspect of the invention, the drive circuit may include an amplification circuit provided in correspondence with each output terminal of the plurality of output terminals, and a drive assistance circuit which assists drive performed by the amplification circuit. The drive assistance circuit may perform preliminary drive on the basis of gradation change information of a data signal.

In a case where a voltage reached by preliminary drive of a drive assistance circuit is shifted from a target voltage, the voltage is corrected by drive of an amplification circuit. However, if the correction is large, a large drive capability is required for the amplification circuit, and power consumption increases. If parasitic capacitances between data lines fluctuate, capacitance charged by the drive assistance circuit differs between the respective data lines, which causes shifting from the target voltage as described above. According to the aspect of the invention, the capacitances between the data lines can be adjusted by a capacitance circuit, and thereby, the capacitance charged by the preliminary drive can be made to be the same in each data line. Thereby, it is possible to reduce an error between the voltage reached by the preliminary drive and the target voltage, and to reduce the power consumption of the amplification circuit.

In addition, in the aspect of the invention, the drive circuit may include first to mth output capacitors that are provided in correspondence with each output terminal of the plurality of output terminals and are provided between the output terminal and first to mth capacitor drive nodes (m is an integer of 2 or more), and a capacitor drive circuit that outputs first to mth capacitor drive voltages corresponding to gradation data to the first to mth capacitor drive nodes.

In the aspect of the invention, charge redistribution between capacitances is used during preliminary drive, and thereby, if electro-optical panel side capacitances are different from each other in each data line, a voltage obtained by performing the charge redistribution are also different from each other. The error is corrected by driving an amplification circuit, but if the correction is large, a large drive capability is required for the amplification circuit, and power consumption increases. According to the aspect of the invention, capacitances between data lines can be adjusted by a capacitance circuit, the electro-optical panel side capacitances can be made to be the same in each data line. Accordingly, it is possible to reduce the error between a voltage reached by the preliminary drive and a target voltage, and to reduce power consumption of the amplification circuit.

In addition, in the aspect of the invention, the electro-optical panel may include a sample hold circuit that samples and holds a plurality of video signals which are the plurality of data signals, and the plurality of output terminals may be connectable to one terminal of the sample hold circuit.

In a case where the sample hold circuit is included, if there is an error between a voltage and a target voltage at a timing when the voltage is held in a source line, display unevenness occurs. One cause of the error is fluctuation of parasitic capacitances between data lines. In this regard, according to the aspect of the invention, the capacitances between the data lines can be adjusted by a capacitance circuit, and thus, display unevenness can be reduced.

In addition, according to another aspect of the invention, an electro-optical device includes the display driver described at any one of the above descriptions, and the electro-optical panel.

In addition, according to still another aspect of the invention, the electro-optical panel may include a sample hold circuit that samples and holds a plurality of video signals which are the plurality of data signals and a plurality of input terminals that are connected to the plurality of output terminals of the display driver, the sample hold circuit may include a plurality of transistors, each having a drain that is connected to a pixel and a source that is connected to any one input terminal of the plurality of input terminals, and the plurality of transistors may include a first transistor having a source and drain which are arranged in this sequence in a first direction of the electro-optical panel and a second transistor that are adjacent to the first transistor in the first direction and has a source and drain which are arranged in this sequence in the first direction.

In addition, according to still another aspect of the invention, the display driver described in any one of the above descriptions is included in an electronic apparatus.

BRIEF DESCRIPTION OF THE DRAWINGS

The invention will be described with reference to the accompanying drawings, wherein like numbers reference like elements.

FIG. 3 is a diagram schematically illustrating parasitic capacitances between data lines.

FIG. 4 is a diagram schematically illustrating capacitance values of the parasitic capacitances between data lines.

FIG. 5 is an example of voltage variation due to coupling of the parasitic capacitances between the data lines.

FIG. 8 is a diagram illustrating a method of measuring the capacitance value of the parasitic capacitance and a method of adjusting the capacitance value of the capacitance circuit.

FIG. 9 is a diagram illustrating the method of measuring the capacitance value of the parasitic capacitance and the method of adjusting the capacitance value of the capacitance circuit.

DESCRIPTION OF EXEMPLARY EMBODIMENTS

Hereinafter, preferred embodiments of the invention will be described in detail. The embodiments which will be described below do not unduly limit the content of the invention described in the claims, and all the configurations described in the embodiments are not indispensable as solution means for the invention.

1. Display Driver

Figure 1:
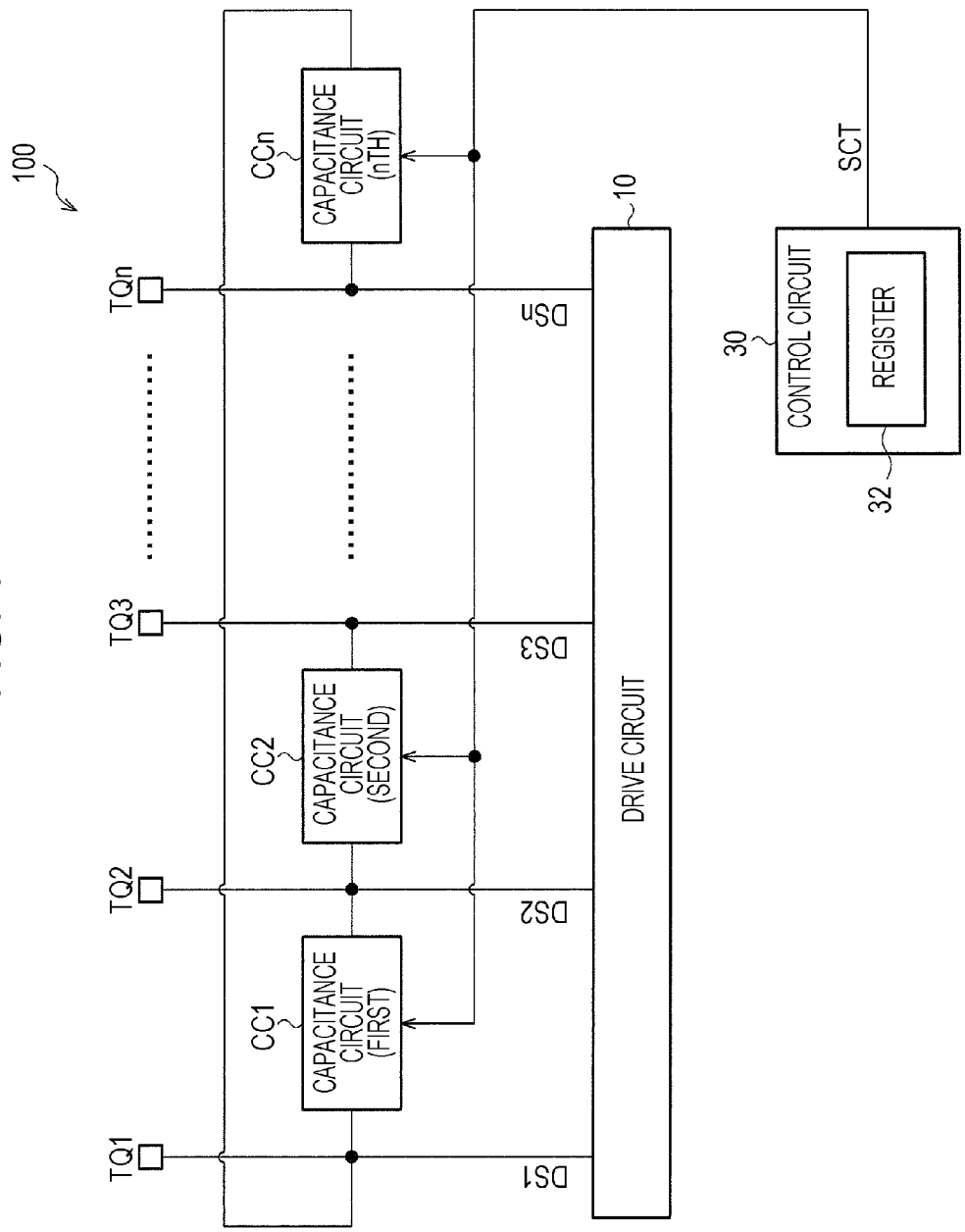
FIG. 1 is a configuration example of a display driver according to an embodiment.

FIG. 1 illustrates a configuration example of a display driver 100 according to an embodiment. The display driver 100 includes a plurality of output terminals TQ1 to TQn, a plurality of capacitance circuits CC1 to CCn, and a control circuit 30. In addition, the display driver 100 includes a drive circuit 10. Here, n is an integer of 2 or more.

The plurality of output terminals TQ1 to TQn output a plurality of data signals DS1 to DSn (a plurality of data voltages) which are output to an electro-optical panel. Each capacitance circuit is provided between output terminals adjacent to the plurality of output terminals TQ1 to TQn. The control circuit 30 sets capacitance values of each capacitance circuit.

Specifically, the plurality of output terminals TQ1 to TQn are first to nth output terminals. In addition, the plurality of capacitance circuits CC1 to CCn are first to nth capacitance circuits. The output terminal TQi and the output terminal TQi+1 are adjacent to each other, one terminal of the capacitance circuit CCi is connected to the output terminal TQi, and the other terminal of the capacitance circuit CCi is connected to the output terminal TQi+1. Here, i is an integer of 1 or more and n−1 or less. The capacitance value of the capacitance circuit CCi can be variably adjusted, and a capacitance value thereof is set by the control signal SCT from the control circuit 30. For example, as will be described with reference to FIG. 6, the capacitance circuit CCi selects whether or not to connect each capacitor of the capacitor group by using a switch group. In this case, the control signal SCT turns on or off switches. Alternatively, the capacitance circuit CCi may include a varactor (variable capacitance diode). In this case, the control signal SCT is a control voltage of the varactor.

The display driver 100 is, for example, an integrated circuit device, and the output terminal TQi is a pad (pad formed on a silicon substrate) of the integrated circuit device or a terminal (terminal to be mounted on a circuit substrate) of a package. Adjacent output terminals TQi and TQi+1 are output terminals connected to adjacent data lines among a plurality of data lines (a plurality of video lines) of the electro-optical panel. No other output terminals are provided between the output terminals TQi and TQi+1 on the silicon substrate or on the package. Terminals other than the output terminals may be provided between the output terminals TQi and TQi+1.

Figure 14:
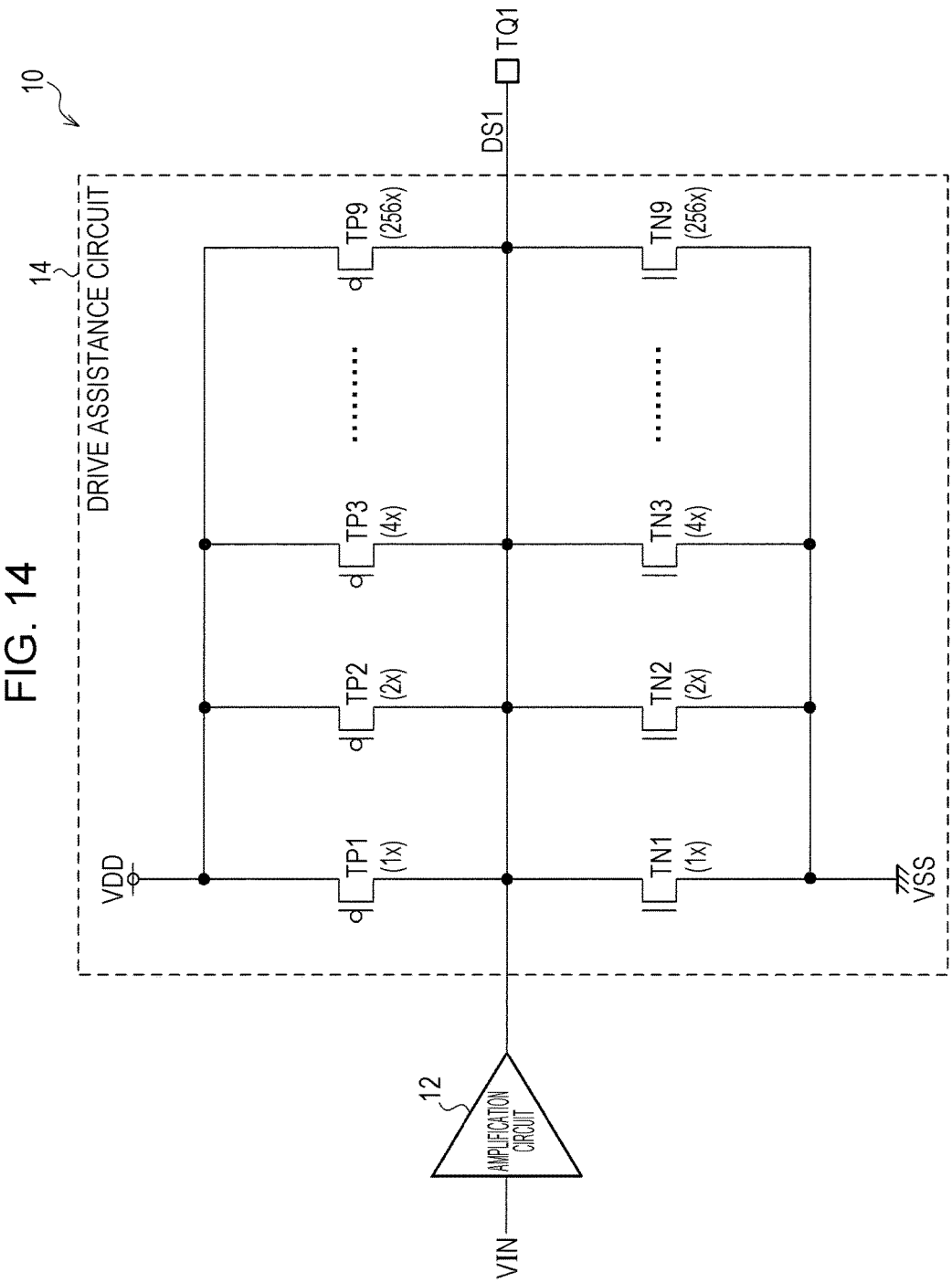
FIG. 14 is a first detailed configuration example of a drive circuit.
Figure 15:
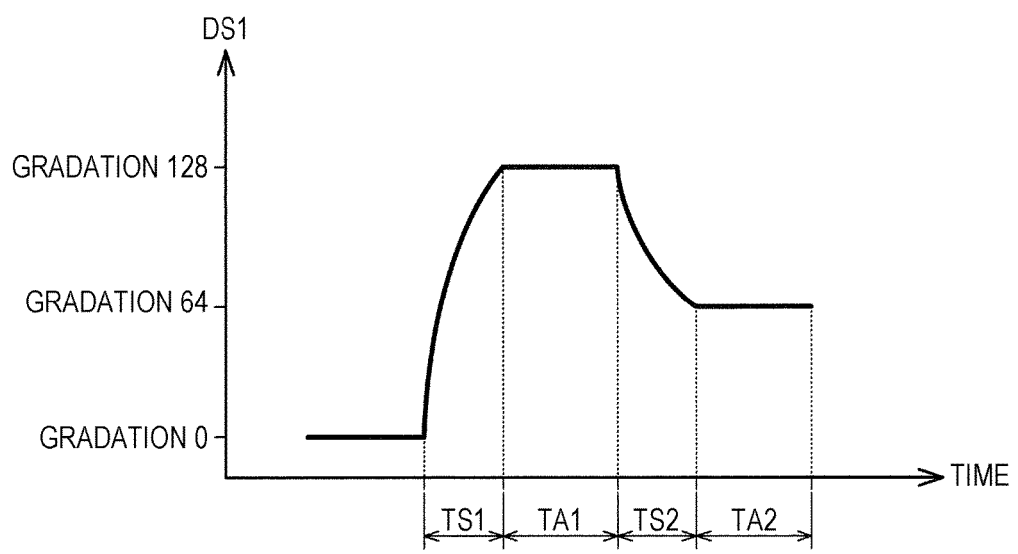
FIG. 15 is a diagram illustrating an operation of the drive circuit of the first detailed configuration example.
Figure 16:
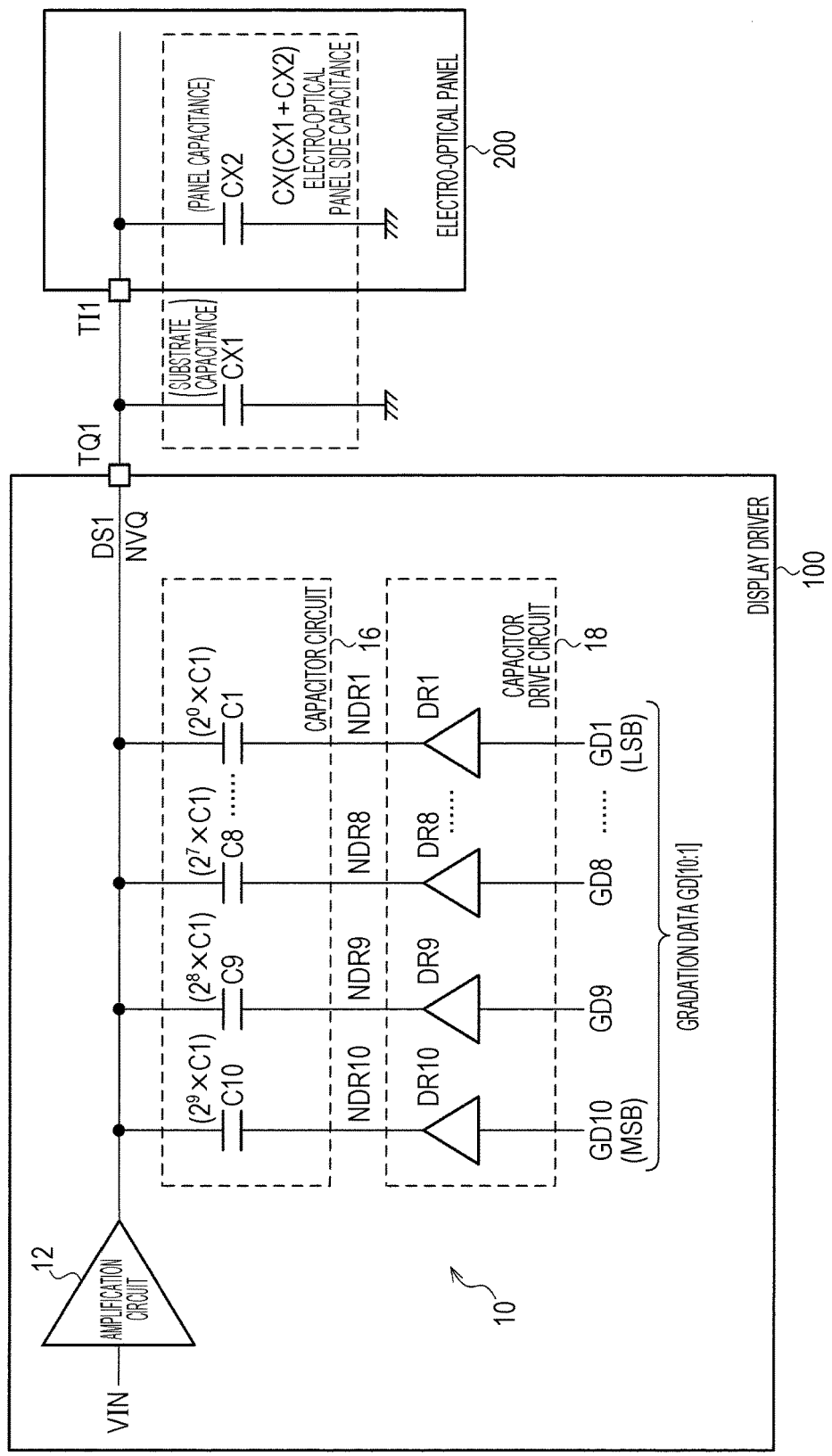
FIG. 16 is a second detailed configuration example of the drive circuit.

As will be described with reference to FIG. 2, transistors for sampling the data signals into source lines in the electro-optical panel are arranged in the order of a source, a drain, a drain, and a source. Therefore, as will be described with reference to FIGS. 3 to 5, the parasitic capacitances between the data lines are different from each other in each data line, and fluctuation of the data voltage due to coupling of the parasitic capacitances varies in each data line. In a case where a digital assistance drive or a capacitance drive which will be described with reference to FIGS. 14 to 16 is used, there is a possibility that display quality decreases (vertical stripe or display unevenness occurs) due to fluctuation of the voltage variation.

In this regard, according to the present embodiment, the capacitance circuit CCi is provided between the adjacent output terminals TQi and TQi+1, and the capacitance value of the capacitance circuit CCi is controlled. Thereby, it is possible to adjust (correct) a sum of the capacitance values of the parasitic capacitance between the data lines and the capacitance circuit CCi in the electro-optical panel so as to be approximately the same in each data line. Since the capacitances between the data lines are approximately the same in each data line, variation of the data voltage due to coupling of the capacitances becomes approximately uniform in each data line, and display quality can be improved.

Since the fluctuation of the parasitic capacitances between the data lines can be adjusted in this way, it is possible to more accurately change a data voltage to a target voltage even in a case where drive is performed without feedback control. Thereafter, in a case where settling to the target voltage is performed by an amplification circuit, it is possible to reduce an error to be corrected, and to output an accurate data voltage while reducing power consumption (drive capability) of the amplification circuit.

In addition, the parasitic capacitance between the data lines depends on a product of the electro-optical panel (or individual differences even in the same product). In this regard, in the present embodiment, the capacitance circuits CC1 to CCn are provided in the display driver 100 and the capacitance between the data lines can be adjusted on a side of the display driver 100, and thereby, it is possible to adjust the capacitance between the data lines in correspondence with various electro-optical panels. Accordingly, an adjustment mechanism is not required to provide on the electro-optical panel side, and in addition, it is also possible to automatically adjust capacitance values of the capacitance circuit CCi as will be described with reference to FIGS. 7 to 13.

In addition, in the present embodiment, the plurality of capacitance circuits CC1 to CCn include capacitance circuits CCn (nth capacitance circuit) provided between the nth output terminal TQn and the first output terminal TQ1 among the first to nth output terminals TQ1 to TQn. Specifically, one terminal of the capacitance circuit CCn is connected to the nth output terminal TQn, and the other terminal of the capacitance circuit CCn is connected to the first output terminal TQ1. A capacitance value of the capacitance circuit CCn is set by the control circuit 30.

In the electro-optical panel of a phase development type as described with reference to FIG. 2, eight (n) data lines VL1 to VL8 are sequentially connected to eight transistors. Accordingly, a parasitic capacitance is generated between the eighth data line VL8 and the first data line VL1. For example, the eighth transistor TR8 connected to the eighth data line VL8 and the ninth transistor TR9 connected to the first data line VL1 are adjacent to each other. Accordingly, a parasitic capacitance is generated between the wires connected to sources SS8 and SS9 of the transistors. Since the parasitic capacitances exist in every eight transistors, a sum thereof is included in the parasitic capacitance between the eighth data line VL8 and the first data line VL1.

As such, in the electro-optical panel of a phase development type, there is also a parasitic capacitance between the nth data line and the first data line, which causes display unevenness due to fluctuation of the parasitic capacitance between the data lines described above. In this regard, according to the present embodiment, the capacitance circuit CCn is provided between the nth output terminal TQn and the first output terminal TQ1, and thereby, the capacitance between the nth data line and the first data line can be adjusted (corrected) the capacitance, and the display unevenness can be reduced.

In addition, in the present embodiment, the control circuit 30 includes a register 32 which stores capacitance value setting information for setting capacitance values of the respective capacitance circuits (CC1, CC2, . . . , CCn). For example, in a case where a capacitance circuit is configured with a capacitor group and a switch group as will be described with reference to FIG. 6, information (data) for setting ON and OFF of each switch is the capacitance value setting information. Alternatively, in a case where the capacitance circuit includes a varactor, the information (for example, setting data, in a case where D/A conversion of setting data is performed to generate the control voltage) for setting a control voltage of the varactor is the capacitance value setting information.

For example, the capacitance value setting information is transferred from a nonvolatile memory (for example, a storage unit 60 in FIG. 17) of the display driver 100 to the register 32. Alternatively, the capacitance value setting information may be written to the register 32 from a processing unit 310 of FIG. 18 through an interface circuit 70 of FIG. 17. In this case, for example, a parasitic capacitance between the data lines of the electro-optical panel is measured in advance by an automatic measurement device or an external measurement device, and the obtained capacitance value setting information is stored in a nonvolatile memory or the storage unit 320 of FIG. 18. Alternatively, the capacitance value setting information obtained by the automatic measurement which will be described with reference to FIGS. 7 to 13 may be written to the register 32. In this case, for example, when power of the display driver 100 is supplied, the parasitic capacitance between the data lines of the electro-optical panel is measured by an automatic measurement, and the capacitance value setting information obtained in this way is stored in the register 32.

According to the present embodiment, the register 32 which stores the capacitance value setting information is included, it is possible to variably adjust capacitance values of the capacitance circuits CC1 to CCn by changing the capacitance value setting information. Thereby, it is possible to adjust capacitance between data lines in correspondence with various electro-optical panels having different parasitic capacitances between the data lines.

2. Electro-Optical Panel

Figure 2:
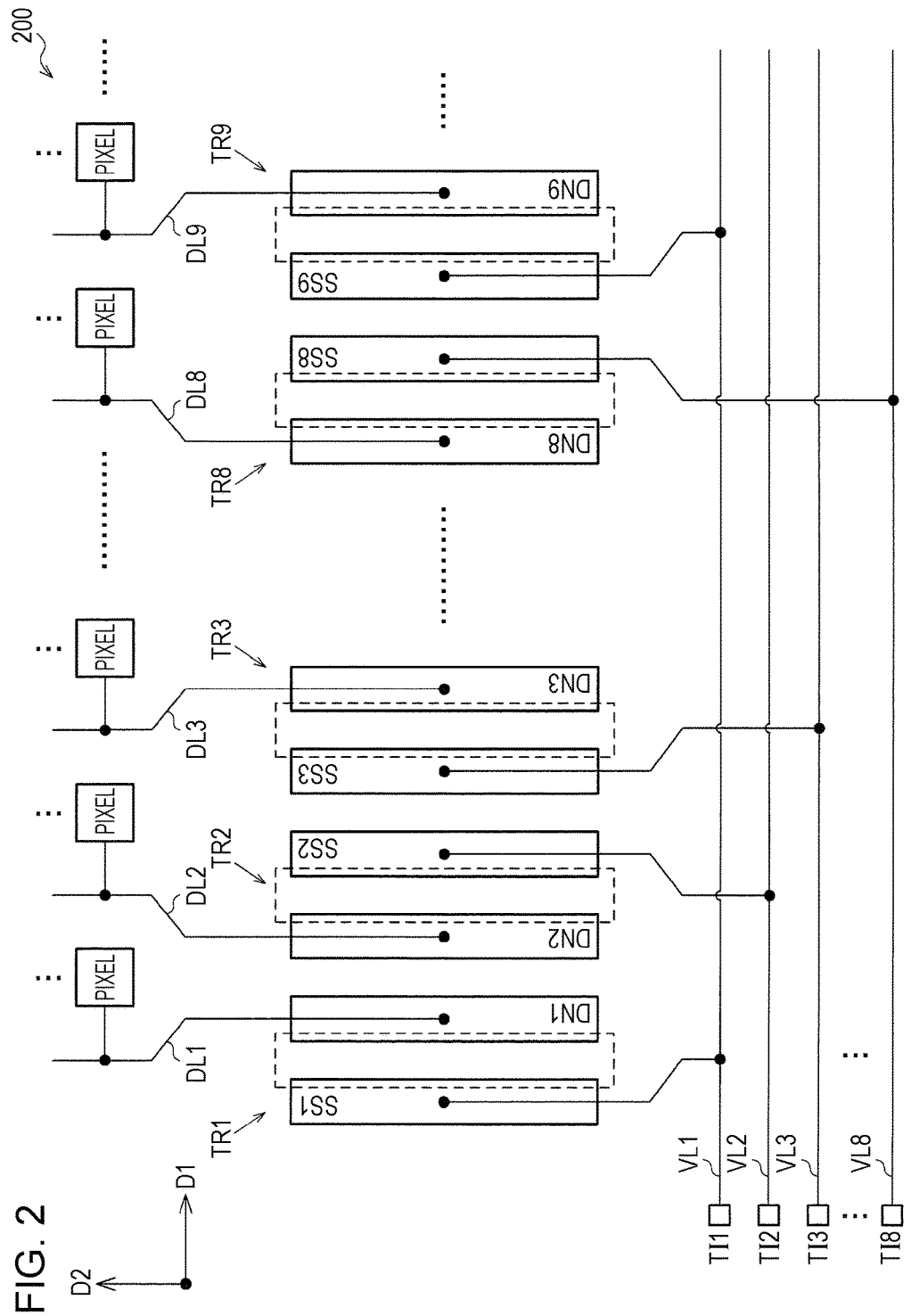
FIG. 2 is a configuration example of an electro-optical panel.

FIG. 2 illustrates a configuration example of the electro-optical panel 200 driven by the display driver 100. In the following description, a liquid crystal display panel of a phase development type of an active matrix type will be described as an example, and an application target of the display driver 100 according to the present embodiment is not limited to this. That is, the display driver 100 according to the present embodiment can be applied an electro-optical panel as long as the electro-optical panel is a type and a drive type in which there is a possibility that display unevenness is formed due to fluctuation of a parasitic capacitance between the data lines. In addition, the electro-optical panel is not limited to the liquid crystal display panel, and may be a display panel (for example, an organic EL display panel) which uses, for example, self-light emitting elements.

The electro-optical panel 200 includes a sample hold circuit that samples and holds a plurality of video signals, which are a plurality of data signals DS1 to DS8. The plurality of output terminals TQ1 to TQ8 of the display driver 100 are connectable to one terminal of the sample hold circuit. In the following description, a case where n=8 will be described as an example, and n is not limited to 8.

Specifically, the sample hold circuit includes transistors TR1, TR2, TR3, . . . respectively connected to the source lines DL1, DL2, DL3, . . . . If the transistors TR1, TR2, TR3, . . . are turned on, the video signals are sampled to the source lines DL1, DL2, DL3, . . . , and if the transistors are turned off, the video signals are held in the source lines DL1, DL2, DL3, . . . . Here, the video signals are drive signals which are used to drive the electro-optical panel by the display driver during the phase development drive.

In a case where the sample hold circuit is provided, if there is an error between the voltage and a target voltage (a voltage corresponding to the display data) at a timing of holding the voltage on the source line, the error causes display unevenness. One cause of the error is the parasitic capacitance between the data lines (video lines). In this regard, according to the present embodiment, the capacitances between the data lines can be adjusted by the capacitance circuits CC1 to CC8, and thus, it is possible to reduce the display unevenness.

In addition, in the present embodiment, the electro-optical panel 200 includes a plurality of input terminals TI1 to TI8 connected to a plurality of output terminals TQ1 to TQ8 of the display driver 100. Each transistor of the plurality of transistors TR1, TR2, TR3, . . . has a drain connected to a pixel and a source connected to one input terminal of the plurality of input terminals TI1 to TI8. The first transistor TR1 has the source and the drain arranged in this sequence in a first direction D1 of the electro-optical panel 200. The second transistor TR2 adjacent to the first transistor TR1 has the drain and the source arranged in this sequence in the first direction D1. In FIG. 2, gates of the transistors are denoted by dotted lines of a rectangular type.

Specifically, the data lines VL1 to VL8 (video lines) arranged in the first direction D1 are connected to the input terminals TI1 to TI8. The data lines VL1 to VL8 are connected to the sources SS1 to SS8 of the transistors TR1 to TR8, and the data lines VL1 to VL8 are connected to sources of next eight transistors in the same manner. The drains DN1, DN2, DN3, . . . of the transistors TR1, TR2, TR3, . . . are connected to the source lines DL1, DL2, DL3, . . . , and the respective source lines are connected to a plurality of pixels (liquid crystal cells, pixel circuits). The respective transistors are arranged such that a longitudinal direction (direction of a channel width) thereof becomes a second direction D2 orthogonal (intersecting) to the first direction D1.

As such, the transistors are arranged such that sequences of the sources and the drains thereof alternate (source, drain, drain, source) with each other, and thereby, the data lines and the source lines are arranged so as to be the data line, the source line, the source line, and the data line. By doing so, a case where two source lines are located between two data lines and a case where two data lines are adjacent to each other are provided. Accordingly, a difference between the parasitic capacitances is made between the data lines.

In addition, both the data line and the source line are arranged in the same region in the arrangement portion of the transistors. In order to densely arrange the pixels and the source lines, the transistors and wires thereof also need to be arranged as densely as possible, and thus, a distance between the lines is significantly narrowed in the portion where both the data line and the source line are arranged. Accordingly, the parasitic capacitance between the data lines in the arrangement portion of the transistors occupies a large proportion of the parasitic capacitance between the data lines in all the data lines, and the difference between the parasitic capacitances between the data lines influences as described above.

FIG. 3 is a diagram schematically illustrating parasitic capacitances between the data lines. The capacitances CP12, CP23, CP34, CP45, CP56, CP67, CP78, and CP81 indicate parasitic capacitances between adjacent input terminals (adjacent output terminals of the display driver 100) of the electro-optical panel 200. For example, the capacitance CP12 is the parasitic capacitance between the input terminals TI1 and TI2.

FIG. 4 is a diagram schematically illustrating the capacitance values of the parasitic capacitances between the data lines. As described with reference to FIG. 2, the parasitic capacitance between the data lines fluctuates depending on arrangement of transistors which are a sample hold circuit. In FIG. 2, the drains DN1 and DN2 are arranged between the sources SS1 and SS2 of the transistors TR1 and TR2, and thereby, the drains DN1 and DN2 (source lines DL1 and DL2) are arranged between the data lines VL1 and VL2. Meanwhile, the sources SS2 and SS3 of the transistors TR2 and TR3 are arranged to be adjacent to each other, and thereby, the data lines VL2 and VL3 are arranged to be adjacent to each other. From this, a capacitance value of the parasitic capacitance CP12 is smaller than a capacitance value of the parasitic capacitance CP23 as illustrated in FIG. 4. In the same manner, capacitance values of the parasitic capacitances CP34, CP56, and CP78 are relatively smaller than capacitance values of the parasitic capacitances CP45, CP67 and CP81. FIG. 4 is an example of characteristics of the parasitic capacitances, and various characteristics can be obtained according to a design of the electro-optical panel.

FIG. 5 illustrates an example of voltage variation due to coupling of parasitic capacitances between the data lines. FIG. 5 represents the voltage variation of output terminals with high impedance, in a case where voltages of the output terminals adjacent to the output terminal with high impedance (in a state where the terminal is not driven by an amplifier or the like) change. For example, "TQ2→TQ1" illustrates the voltage variation of the output terminal TQ1 with high impedance in a case where a voltage of the output terminal TQ2 changes (for example, changes from the lowest gradation to the highest gradation). While not illustrated, the voltage variation of "TQ1→TQ2" is the same as the voltage variation of "TQ2→TQ1".

The greater the parasitic capacitance between the data lines is, the greater the voltage variation due to coupling of the parasitic capacitances. That is, characteristic of the voltage variation are the same as characteristics of the parasitic capacitance of FIG. 4. For example, if the parasitic capacitance between the input terminals TI4 and TI5 (output terminals TQ4 and TQ5) is maximum, the voltage variation of "TQ5→TQ4" is maximized. It is assumed that a maximum value of the voltage variation (voltage difference) is referred to as VM. In the present embodiment, the capacitances between the data lines are adjusted such that the voltage variation between the adjacent output terminals is the same (includes approximately the same as) as the maximum value VM, that is, such that the capacitance between the data lines is the same as a maximum capacitance value. For example, a capacitance value of the capacitance circuit CC3 is adjusted such that a total sum of capacitance values of the capacitance circuit CC3 and the parasitic capacitance CP34 is the same as a capacitance value of the parasitic capacitance CP45.

3. Capacitance Circuit

Figure 6:
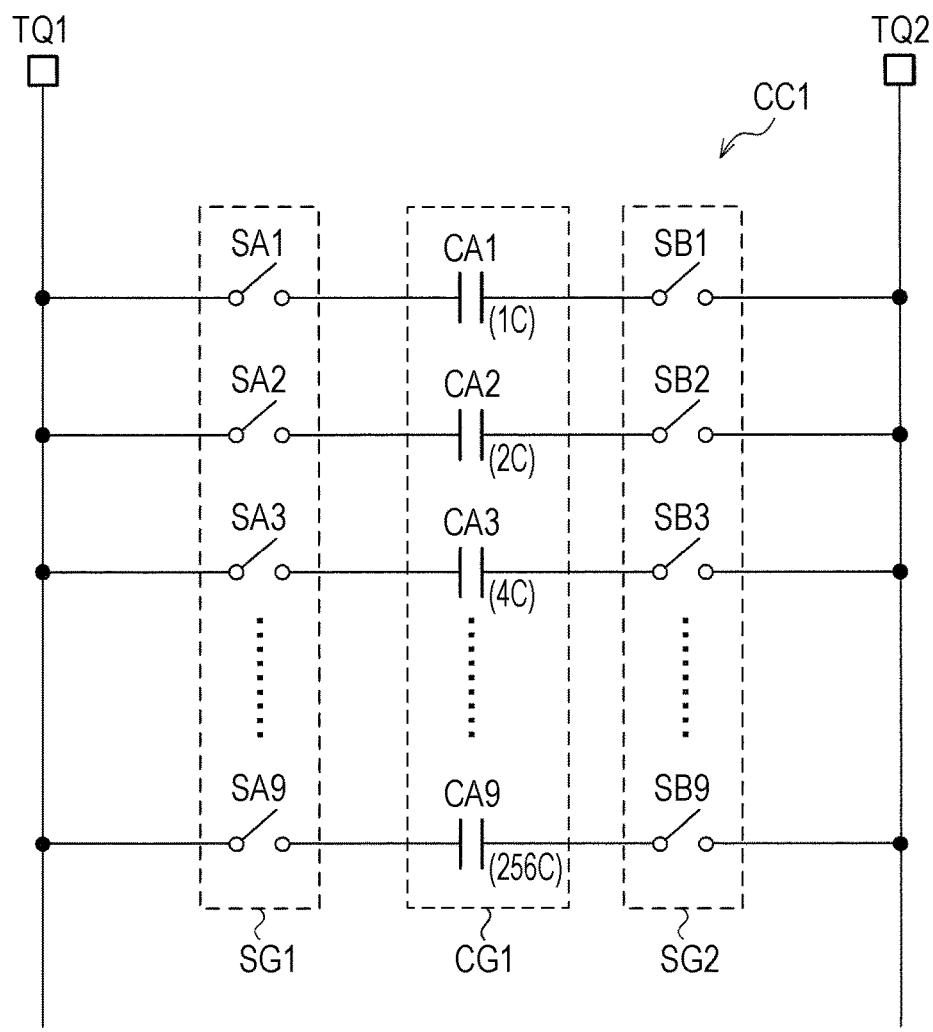
FIG. 6 is a detailed configuration example of a capacitance circuit.

FIG. 6 illustrates a detailed configuration example of the capacitance circuit CC1. The capacitance circuits CC2 to CCn can also be configured to be the same as the capacitance circuit CC1. The capacitance circuit CC1 includes a capacitor group CG1 and at least two switch groups SG1 and SG2 respectively connected between each capacitor of the capacitor group CG1 and the output terminals TQ1 and TQ2.

According to the present embodiment, connections between each capacitor and the output terminals TQ1 and TQ2 can be controlled by the switch groups SG1 and SG2. Thereby, capacitances between the adjacent output terminals TQ1 and TQ2 can be adjusted by the capacitance circuit CC1, and the capacitance between the data lines can be equalized by correcting fluctuation of the parasitic capacitance between the data lines.

Specifically, the capacitance circuit CC1 includes the first switch group SG1 and the second switch group SG2 as at least one switch group. One terminal of the first switch group SG1 is connected to the first output terminal TQ1 (ith output terminal TQi), and the other end thereof is connected to one terminal of the capacitor group CG1. One terminal of the second switch group SG2 is connected to the second output terminal TQ2 ((i+1)th output terminal TQi+1) adjacent to the first output terminal TQ1 and the other terminal thereof is connected to the other terminal of the capacitor group CG1.

More specifically, the switch group SG1 includes switches SA1 to SA9 (in a broad sense, first to pth switches, p is an integer larger than or equal to 2), the capacitor group CG1 includes capacitors CA1 to CA9 (first to pth capacitors), and the switch group SG2 includes switches SB1 to SB9 (first to pth switches). One terminal of the switch SAj (j is an integer larger than or equal to 1 and smaller than or equal to 9) is connected to the output terminal TQ1 and the other terminal thereof is connected to one terminal of the capacitor CAj. One terminal of the switch SBj is connected to the output terminal TQ2, and the other terminal thereof is connected to the other terminal of the capacitor CAj. The switches SAj and SBj are, for example, transistors which are turned on or off by the control circuit 30 illustrated in FIGS. 1 and 17.

According to the present embodiment, the capacitor group CG1 is connected between the adjacent output terminals TQ1 and TQ2 by the first switch group SG1 and the second switch group SG2. Accordingly, each switch can be turned on or off, and thereby, whether or not each capacitor is connected between the adjacent output terminals TQ1 and TQ2 can be controlled. That is, in a case where the switches SAj and SBj are turned on, the capacitor CAj is connected between the output terminals TQ1 and TQ2, and in a case where the switches SAj and SBj are turned off, the capacitor CAj is not connected between the output terminals TQ1 and TQ2.

In the present embodiment, capacitance values of each capacitor of the capacitor group CG1 are weighted by binary numbers. That is, if the capacitance value of the capacitor CA1 is 1 C, the capacitance value of the capacitor CAj is $2^{j-1}$ C.

By doing so, the capacitance values of the capacitance circuit CC1 can be adjusted by 1 C in a range of 1 C to 256 C ($2^{p-1}$ C in a broad sense) by controlling the switch groups SG1 and SG2 with a binary code.

4. Measurement Circuit

Figure 7:
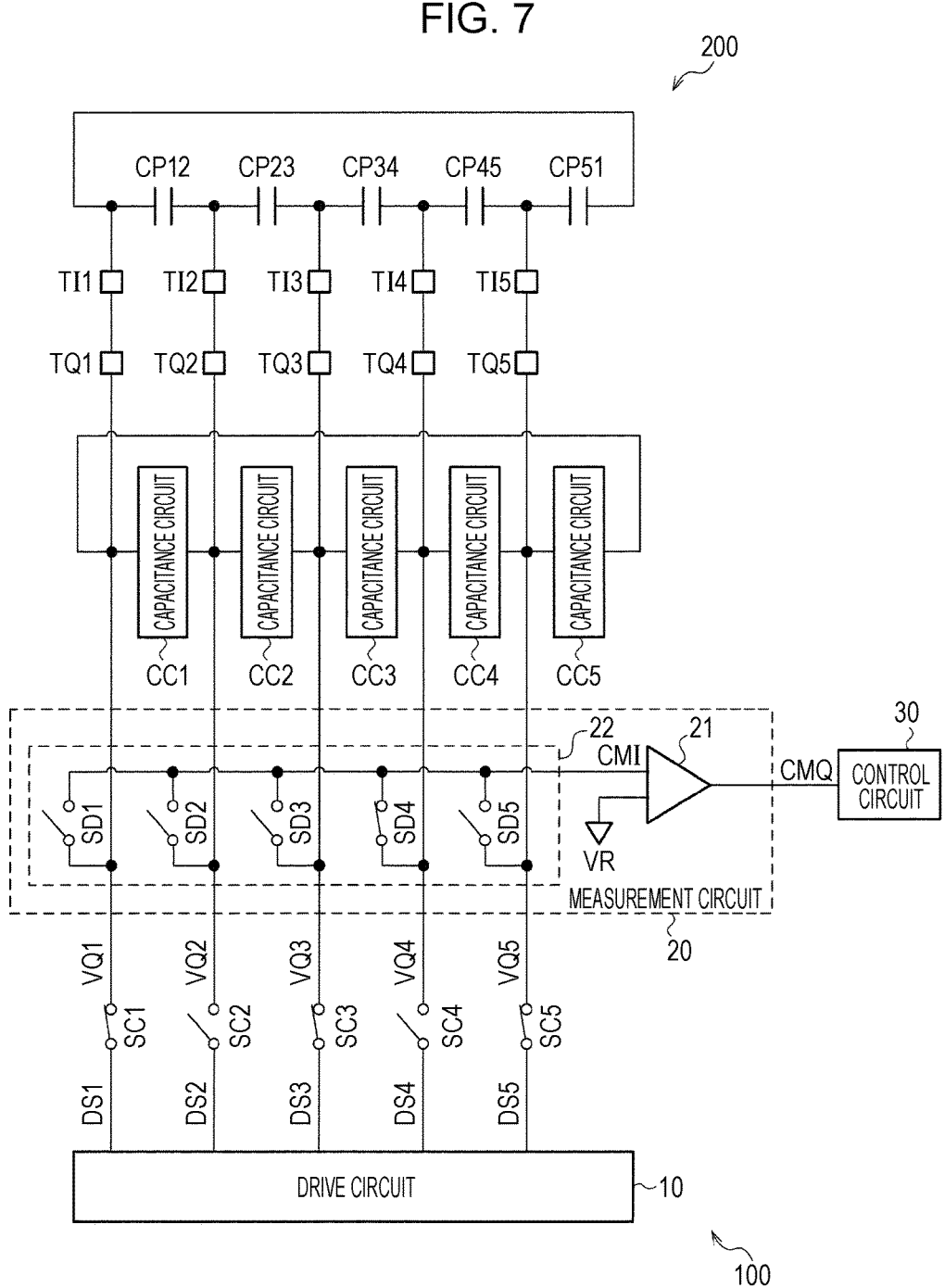
FIG. 7 is a detailed configuration example of the display driver in a case where a measurement circuit is included.

FIG. 7 illustrates a detailed configuration example of the display driver 100 including a measurement circuit 20. The display driver 100 of FIG. 7 includes the output terminals TQ1 to TQ5, the capacitance circuits CC1 to CC5, switches SC1 to SC5, the measurement circuit 20, the control circuit 30, and the drive circuit 10. In the following description, a case where n=5 will be described as an example, but n is not limited to 5.

The measurement circuit 20 measures capacitance value information between the plurality of data lines of the electro-optical panel 200. The capacitance values of each capacitance circuit (CC1 to CC5) are set, based on the capacitance value information measured by the measurement circuit 20.

Specifically, the measurement circuit 20 measures capacitance values of parasitic capacitances CP12, CP23, CP34, CP45, and CP51 between the adjacent data lines, and acquires capacitance value information corresponding to the capacitance values. The capacitance value information may be information (data) representing the capacitance value itself, may be information for varying depending on the capacitance value, or may be information associated one-to-one with each capacitance value.

According to the present embodiment, the capacitance value of the capacitance circuit can be adjusted by measuring the capacitance value information between the data lines, based on the capacitance value information, such that the capacitances between the data lines are the same.

In addition, in the present embodiment, the measurement circuit 20 includes a comparison circuit 21 (comparator) to which a determination voltage VR (reference voltage) is input to a first input terminal (for example, a negative polarity terminal) and a switch group 22 that connects one output terminal of the plurality of output terminals TQ1 to TQ5 to a second input terminal (for example, a positive polarity terminal) of a comparison circuit 21.

Specifically, the switch group 22 includes switches SD1 to SD5. Each one terminal of the switches SD1 to SD5 is connected to the output terminals TQ1 to TQ5 and the other terminals thereof are connected to the second input terminal of the comparison circuit 21. The switches SD1 to SD5 are, for example, transistors, and are turned on or off by the control circuit 30. The determination voltage VR is supplied from, for example, a voltage generation circuit 50 of FIG. 17.

According to the present embodiment, any one output terminal is connected to a second input terminal of the comparison circuit 21 by the switch group 22, and a voltage of the output terminal is compared with the determination voltage VR. Thereby, it is possible to compare a voltage variation of the output terminal with the determination voltage VR, and to acquire capacitance value information from the comparison result.

More specifically, in a case where a voltage of the ith output terminal TQi changes, the switch group 22 connects the (i+1)th output terminal TQi+1 adjacent to the ith output terminal TQi to the second input terminal. The comparison circuit 21 compares the voltage of the (i+1)th output terminal TQi+1 with the determination voltage VR.

For example, in a case where a voltage of the output terminal TQ3 (TQi) changes, the switches SD1 to SD3 and SD 5 are turned off, the switch SD4 (SDi+1) is turned on, and the output terminal TQ4 (TQi+1) is connected to the second input terminal of the comparison circuit 21. At this time, a voltage CMI of the second input terminal becomes a voltage VQ4 of the output terminal TQ4. The comparison circuit 21 compares a voltage CMI=VQ4 with the determination voltage VR, and outputs a signal CMQ which is the comparison result to the control circuit 30. The control circuit 30 acquires capacitance value information based on the signal CMQ.

The ith output terminal and the (i+1)th output terminal may be adjacent to each other, and a sequence thereof is not limited. That is, a case where first, second, and numbers are attached to the output terminals TQ1, TQ2, . . . is described in the above description, and the embodiment is not limited to this and first, second, . . . and numbers may be attached to the output terminals TQ5, TQ4, . . . .

According to the present embodiment, in a case where the voltage of the output terminal TQi adjacent to the output terminal TQi+1 changes, the voltage variation of the output terminal TQi+1 can be compared with the determination voltage VR by the comparison circuit 21. Since a magnitude of the voltage variation of the output terminal TQi+1 changes depending on the capacitance value of the parasitic capacitance between the adjacent data lines, the capacitance value of the parasitic capacitance can be measured based on the comparison results obtained by the comparison circuit 21.

Data signals DS1 to DS5 (data voltages) from the drive circuit 10 are supplied to each one terminal of the switches SC1 to SC5, and voltages VQ1 to VQ5 of the output terminals TQ1 to TQ5 are supplied to the other terminals of the switches SC1 to SC5. In a case where switch SCi is turned on, VQi=DSi. The switches SC1 to SC5 are, for example, transistors which are turned on or off by the control circuit 30.

FIGS. 8 and 9 are diagrams illustrating a method of measuring the capacitance value of the parasitic capacitance and a method of adjusting the capacitance value of the capacitance circuit.

FIG. 8 illustrates a voltage VQ4 of the output terminal TQ4 in a case where a voltage VQ3 of the output terminal TQ3 is changed. In this case, the switches SC1, SC3, and SC5 of FIG. 7 are turned on and the switches SC2 and SC4 are turned off. In addition, the switch SD4 is turned on, and the switches SD1 to SD3 and the switch SD5 are turned off. The drive circuit 10 gradually (stepwise) changes the voltage VQ3=DS3 with a predetermined voltage width. A voltage setting value is, for example, a count value of a counter, and the voltage VQ3=DS3 increases (or decreases) by a predetermined voltage width every time when the count value increases by 1. The voltage VQ4 is gradually changed by the parasitic capacitance CP34 between the output terminals TQ3 and TQ4, according to the change of the voltage VQ3. A voltage width of one step of the voltage variation is determined by a capacitance value of the parasitic capacitance CP34. In the example of FIG. 8, when the voltage setting value changes from 7 to 8, the voltage VQ4 is larger than the determination voltage VR, and a logic level of the output signal CMQ of the comparison circuit 21 changes (for example, changes from a low level to a high level).

FIG. 9 illustrates a voltage VQ5 of the output terminal TQ5 in a case where the voltage VQ4 of the output terminal TQ4 changes. In this case, the switches SC1, SC2, and SC4 of FIG. 7 are turned on and the switches SC3 and SC5 are turned off. In addition, the switch SD5 is turned on, and the switches SD1 to SD4 are turned off. The drive circuit 10 gradually (stepwise) changes the voltage VQ4=DS4 with a predetermined voltage width. The voltage VQ5 is gradually changed by the parasitic capacitance CP45 between the output terminals TQ4 and TQ5, according to the change of the voltage VQ4. In the example of FIG. 9, when the voltage setting value changes from 3 to 4, the voltage VQ5 is larger than the determination voltage VR, and the logic level of the output signal CMQ of the comparison circuit 21 changes.

For example, it is assumed that the capacitance value of CP45 of the parasitic capacitances CP12, CP23, CP34, CP45, and CP51 is maximum. In this case, the logic level of the output signal CMQ of the comparison circuit 21 is changed by the voltage setting value (4 in the example of FIG. 9) in which the voltage VQ5 is minimum in a case where the voltage VQ4 is changed. As illustrated in FIG. 8, when the capacitance value of the capacitance circuit CC3 is adjusted, the voltage VQ4 in a case where the voltage VQ3 is changed sets the capacitance value of the capacitance circuit CC3 such that a logic level of the output signal CMQ of the comparison circuit 21 is changed by the minimum voltage setting value (4). By performing the adjustment, a total sum of the capacitance values of the parasitic capacitance CP34 and the capacitance circuit CC3 is approximately equal to a maximum capacitance value of the parasitic capacitance CP45. The same adjustment is also performed for the capacitance circuits CC1, CC2, and CC5. The capacitance circuit CC4 does not vary from, for example, a predetermined capacitance value (for example, 0) set at the time of measurement.

Figure 10:
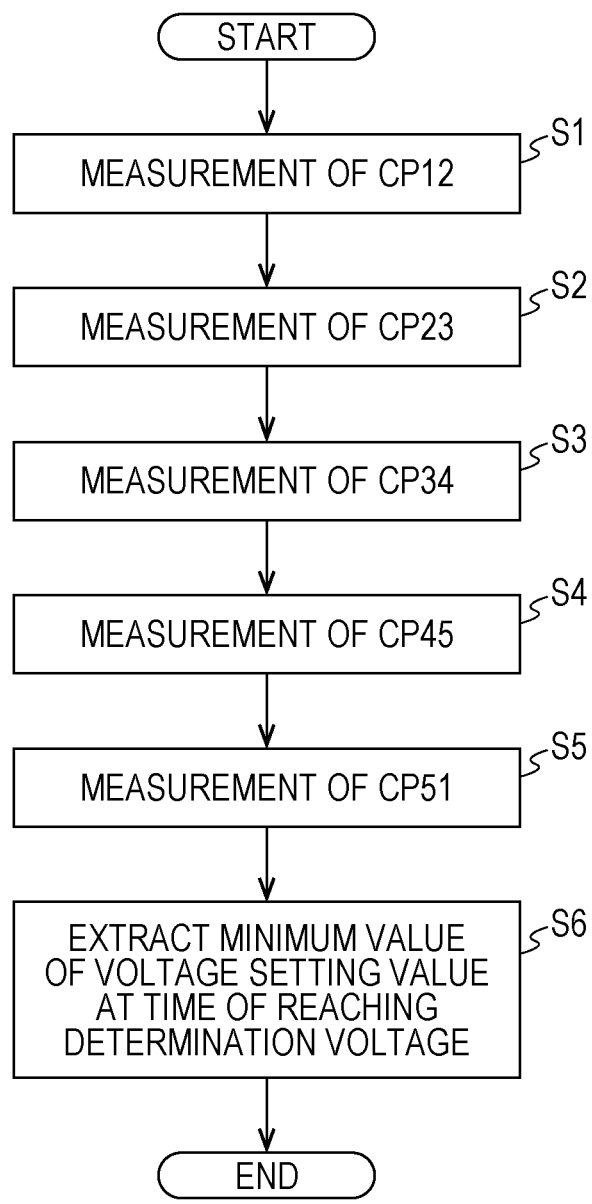
FIG. 10 is a flowchart of processing of measuring the capacitance value of the parasitic capacitance.

FIG. 10 is a flowchart of processing of measuring the capacitance value of the parasitic capacitance. If the processing starts, the measurement circuit 20 and the control circuit 30 sequentially measure the capacitance values of the parasitic capacitances CP12, CP23, CP34, CP45, and CP51 (S1 to S5). That is, the control circuit 30 acquires a voltage setting value (voltage setting value when the logic level of the output signal CMQ of the comparison circuit 21 changes) when a voltage of the output terminal reaches the determination voltage VR, for each parasitic capacitance. A measurement sequence of the parasitic capacitances CP12, CP23, CP34, CP45, and CP51 is not limited to this, and may be in any sequence. Next, the control circuit 30 extracts a minimum value, which is acquired for each parasitic capacitance, among the voltage setting values obtained when the voltage of the output terminal reaches the determination voltage VR (S6).

Figure 11:
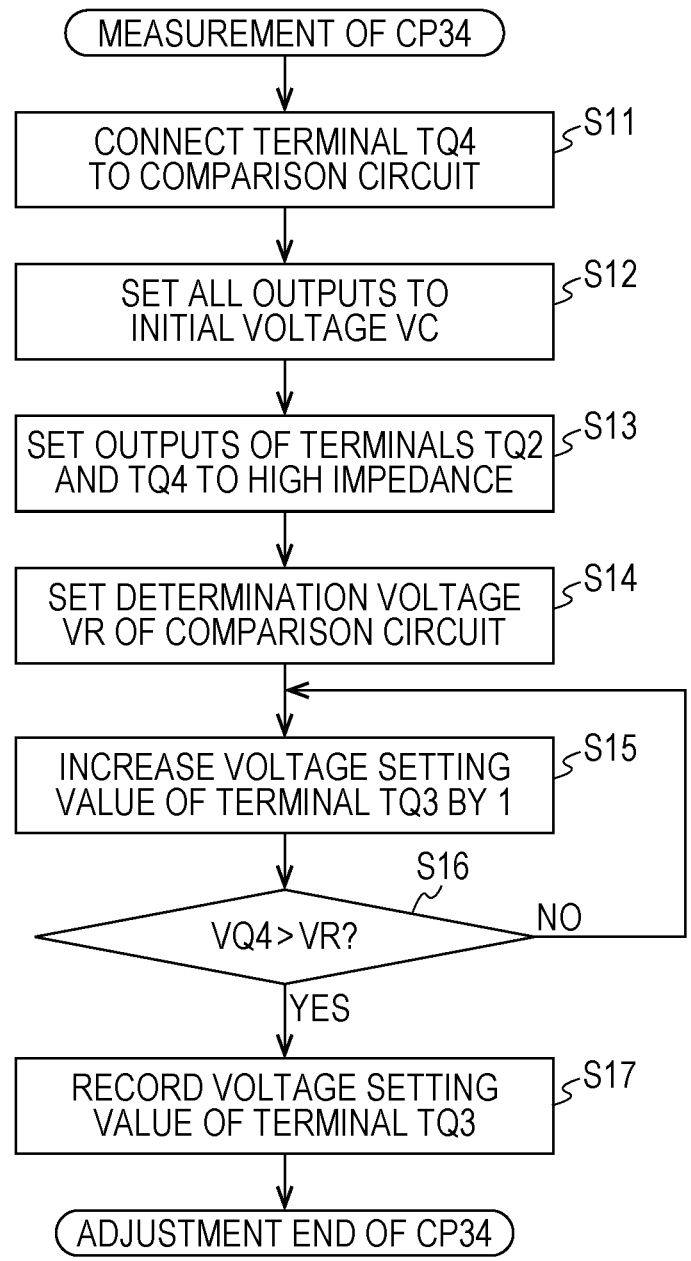
FIG. 11 is a detailed flowchart of the processing of measuring the capacitance value of the parasitic capacitance.
Figure 17:
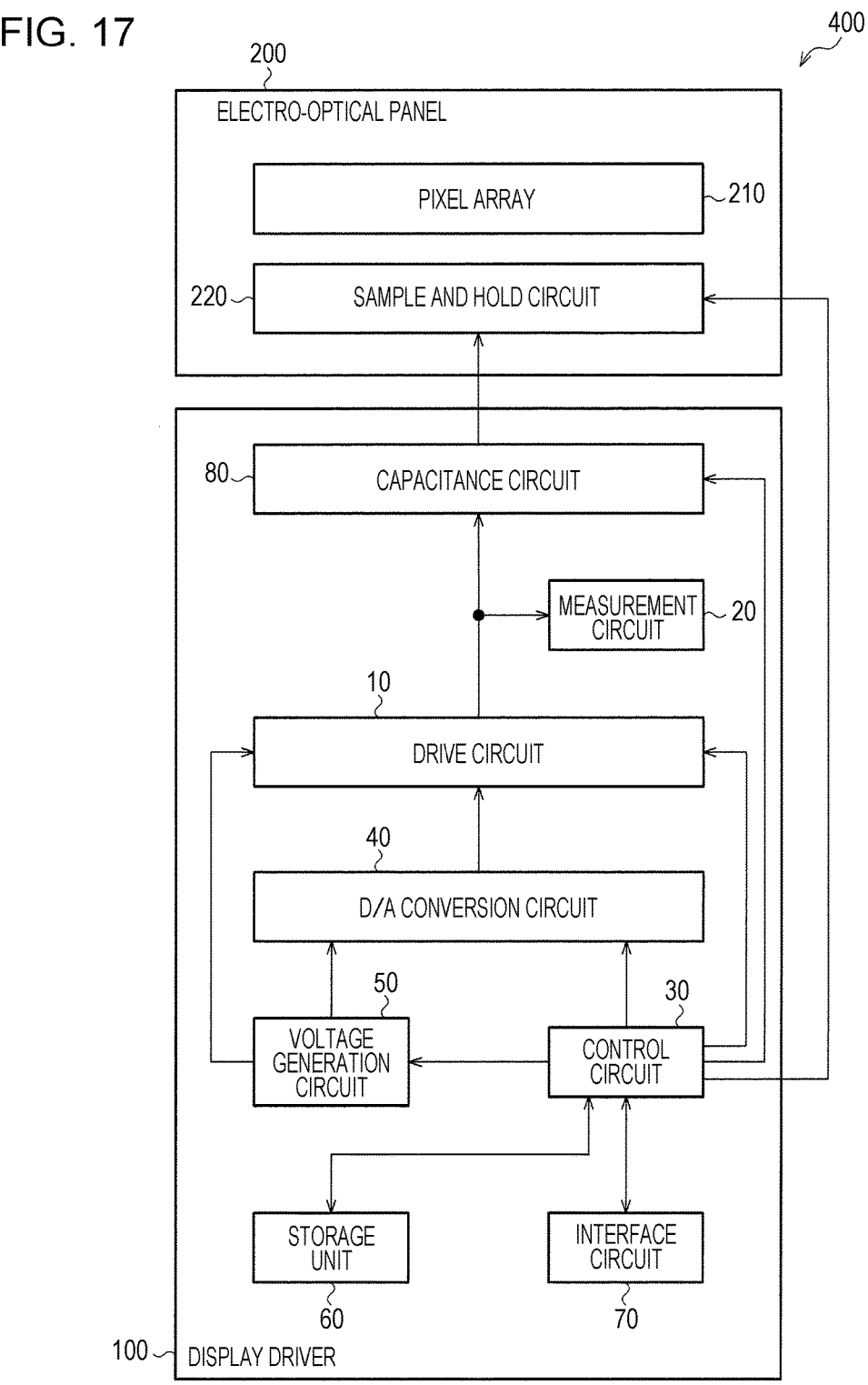
FIG. 17 is a configuration example of an electro-optical device.

FIG. 11 is a detailed flowchart of the processing (S3) of measuring the capacitance value of the parasitic capacitance CP34. The capacitance values of the parasitic capacitances CP12, CP23, CP45, and CP51 can also be measured by the same processing. If the processing starts, the control circuit 30 connects the output terminal TQ4 to the comparison circuit 21 (S11). That is, the control circuit 30 turns on the switch SD4. Next, the drive circuit 10 sets all the outputs to an initial voltage VC (S12). That is, the control circuit 30 turns on the switches SC1 to SC5, and the drive circuit 10 outputs the initial voltage VC as the data signals DS1 to DS5. The initial voltage VC is, for example, a common voltage supplied to a common electrode of the electro-optical panel 200. Next, the control circuit 30 sets the outputs of the output terminals TQ2 and TQ4 to high impedance (S13). That is, the control circuit 30 turns off the switches SC2 and SC4. Next, the determination voltage VR of the comparison circuit 21 is set (S14). For example, the determination voltage VR from the voltage generation circuit 50 of FIG. 17 is input to the first input terminal of the comparison circuit 21 in accordance with selection of a selector or the like.

Next, the control circuit 30 increases the voltage setting value of the output terminal TQ3 by 1 (S15). That is, the control circuit 30 increases the voltage setting value of the output terminal TQ3 by +1, and the drive circuit 10 outputs the voltage VQ3=DS3 according to the voltage setting value. For example, the initial value of the voltage setting value is zero, and the initial value is the voltage VQ3=VC. The change of the voltage setting value in step S15 is not limited to +1, and the voltage setting value may vary such that the voltage VQ3 gradually increases (or decreases). Next, the comparison circuit 21 determines whether or not the voltage VQ4 of the output terminal TQ4 is larger than the determination voltage VR (S16). In a case where it is determined that the voltage VQ4 is lower than or equal to the determination voltage VR, the control circuit 30 increases the voltage setting value of the output terminal TQ3 by 1 (S15). Meanwhile, in a case where it is determined that the voltage VQ4 is larger than the determination voltage VR, the control circuit 30 records the voltage setting value of the output terminal TQ3 at that time (S17).

Figure 12:
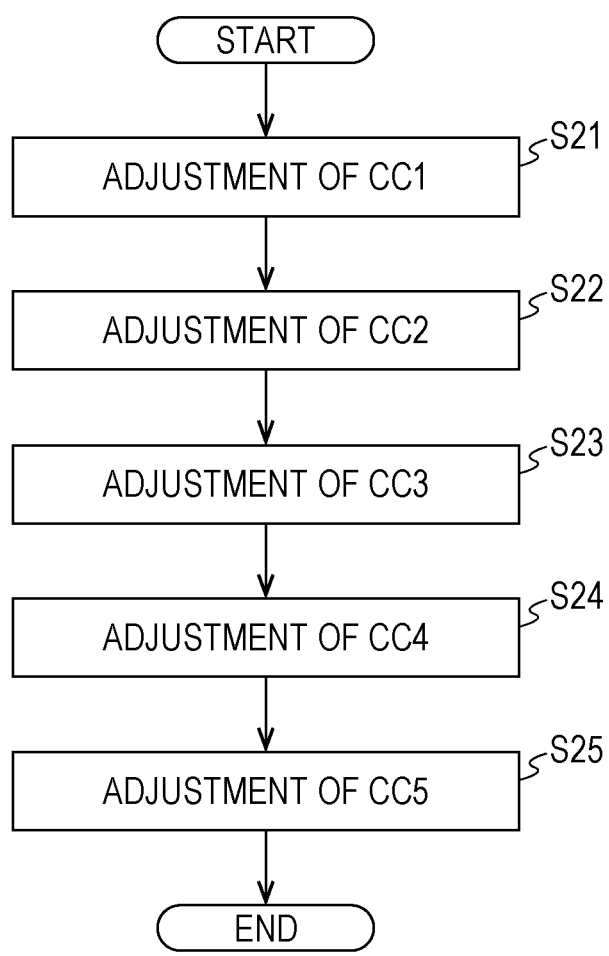
FIG. 12 is a flowchart of processing of adjusting the capacitance value of the capacitance circuit.

FIG. 12 is a flowchart of the processing of adjusting the capacitance value of the capacitance circuit. If the processing starts, the control circuit 30 sequentially adjusts the capacitance values of the capacitance circuits CC1, CC2, CC3, CC4, and CC5 (S21 to S25). The adjustment sequence of the capacitance values of the capacitance circuits CC1, CC2, CC3, CC4, and CC5 is not limited to this, and may be in any sequence.

Figure 13:
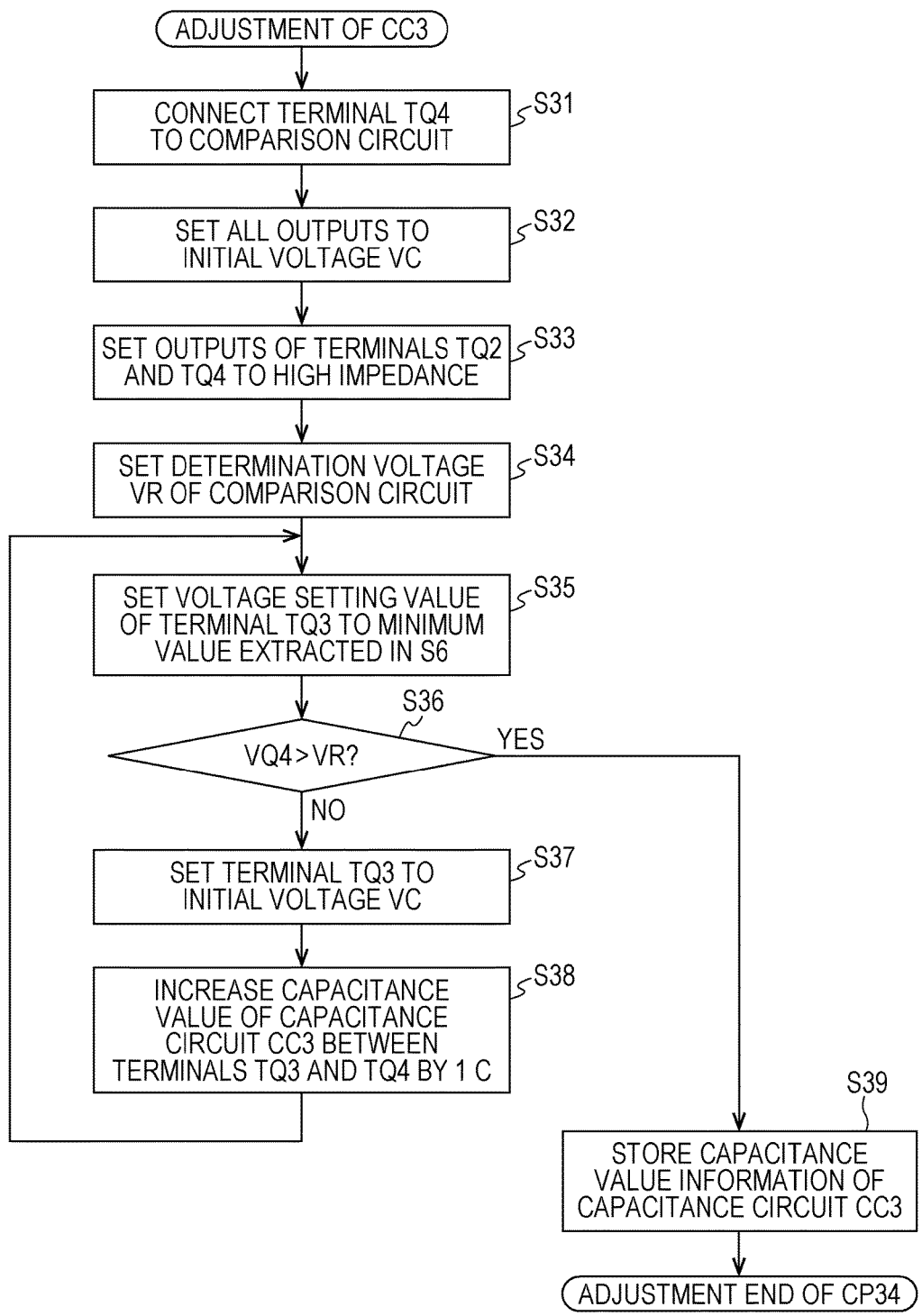
FIG. 13 is a detailed flowchart of the processing of adjusting the capacitance value of the capacitance circuit.

FIG. 13 is a detailed flowchart of the processing (S23) of adjusting the capacitance value of the capacitance circuit CC3. The capacitance values of the capacitance circuits CC1, CC2, CC4, and CC5 can also be adjusted by the same processing. If the processing starts, the control circuit 30 connects the output terminal TQ4 to the comparison circuit 21 (S31). That is, the control circuit 30 turns on the switch SD4. Next, the drive circuit 10 sets all the outputs to the initial voltage VC (S32). That is, the control circuit 30 turns on the switches SC1 to SC5, and the drive circuit 10 outputs the initial voltage VC as the data signals DS1 to DS5. Next, the control circuit 30 sets the outputs of the output terminals TQ2 and TQ4 to high impedance (S33). That is, the control circuit 30 turns off the switches SC2 and SC4. Next, the determination voltage VR of the comparison circuit 21 is set (S34). For example, the determination voltage VR from the voltage generation circuit 50 of FIG. 17 is input to the first input terminal of the comparison circuit 21 in accordance with selection of a selector or the like.

Next, the control circuit 30 sets the voltage setting value of the output terminal TQ3 to a minimum value extracted in step S6 (S35). That is, the control circuit 30 changes the voltage setting value (for example, 0) corresponding to the initial voltage VC to the minimum value (4 in the example of FIG. 9) extracted in step S6, and the drive circuit 10 outputs a voltage VQ3=DS3 according to the voltage setting value. Next, the comparison circuit 21 determines whether or not the voltage VQ4 of the output terminal TQ4 is higher than the determination voltage VR (S36). In a case where it is determined that the voltage VQ4 is lower than or equal to the determination voltage VR, the drive circuit 10 sets the output terminal TQ3 to the initial voltage VC (S37). Next, the control circuit 30 increases the capacitance value of the capacitance circuit CC3 between the output terminals TQ3 and TQ4 by 1 C (S38) and the processing returns to step S35. The initial value of the capacitance value is, for example, 0 C. Meanwhile, in a case where it is determined that the voltage VQ4 is higher than the determination voltage VR in step S36, the control circuit 30 stores the capacitance value of the capacitance circuit CC3 at that time (S39).

For example, there is a method of adjusting a capacitance value of a capacitance circuit by measuring only capacitance values of some parasitic capacitances as a modified example of the measuring method and the adjusting method, as will be described below. That is, as described with reference to FIG. 4, the capacitance values of the parasitic capacitances are sequentially increased and decreased, and a magnitude ratio thereof is approximately the same. Hence, a parasitic capacitance with a small capacitance value and a parasitic capacitance with a large capacitance value are measured one by one (for example, S1, S2, and S6 of FIG. 10 are executed to measure CP12 and CP23). Next, the capacitance value of the capacitance circuit corresponding to the parasitic capacitance with a small capacitance value is adjusted so as to match the parasitic capacitance with a large capacitance value (for example, in a case where CP12<CP23, S21 of FIG. 12 is performed to adjust the capacitance value of CC1). The capacitance circuit corresponding to other data lines with a small capacitance value of the parasitic capacitance is also set to the same capacitance value (for example, in a case where CP34 and CP51 are smaller than CP23 and CP45, the capacitance values of CC3 and CC5 are set to be equal to the capacitance value CC1).

5. Drive Circuit

FIG. 14 is a first detailed configuration example of the drive circuit 10. The drive circuit 10 in FIG. 14 includes an amplification circuit 12 provided corresponding to the output terminal TQ1 and a drive assistance circuit 14 which assists drive performed by the amplification circuit 12. The drive assistance circuit 14 performs a preliminary drive on the basis of gradation change information of the data signal DS1. In the following description, the amplification circuit 12 and the drive assistance circuit 14 provided in correspondence with the output terminal TQ1 will be described as an example, but the same amplification circuit and drive assistance circuit are provides in correspondence with each output terminal of the plurality of output terminals TQ1 to TQn.

Specifically, the amplification circuit 12 amplifies an output voltage VIN of a D/A conversion circuit (D/A conversion circuit 40 of FIG. 17) and outputs the amplified voltage to the output terminal TQ1. The drive assistance circuit 14 includes P-type transistors TP1 to TP9 (first conduction type transistors) provided between a node of a high potential side power supply voltage VDD and the output terminal TQ1, and an N-type transistors TN1 to TN9 (second conduction type transistors) provided between a node of a low potential side power supply voltage VSS and the output terminal TQ1. In a case where drive capability of the transistors TP1 and TN1 is 1×, drive capability of the transistors TPk and TNk (k is an integer larger than or equal to 1 and smaller than or equal to 9) is $2^{k-1}\times$. For example, the drive capability is a drain current with respect to the same gate-source voltage, and is set by, for example, a channel width (W/W of L) of the transistor or the number of unit transistors. The transistors TP1 to TP9 and TN1 to TN9 are turned on or off by a control circuit 30. The control circuit 30 calculates drive capability according to the voltage change (gradation change of display data) of the data signal DS1 and turns on the transistor of the drive capability corresponding to the drive capability thereof, and the preliminary drive is performed by the transistor which is turned on. In the example of FIG. 14, the drive capability can be set 1× step by 1× step within a range of 1× to 511×.

FIG. 15 is a diagram illustrating an operation of the drive circuit 10 of FIG. 14. In FIG. 15, a case where the gradation is changed from 0 to 128 and a case where the gradation is changed from 128 to 64 will be described as an example. In addition, here, it is assumed that a voltage of the data signal DS1 is large as the gradation is large.

In a case where the gradation is changed from 0 to 128, the drive assistance circuit 14 changes the data signal DS1 from a voltage corresponding to the gradation 0 to a voltage (that is, high potential side power supply voltage VDD Side) corresponding to the gradation 128, during a preliminary drive period TS1. During an amplification drive period TA1 after the preliminary drive period TS1, the amplification circuit 12 outputs the voltage corresponding to the gradation 128 to the output terminal TQ1.

During the preliminary drive, the control circuit 30 calculates the drive capability for generating a voltage difference corresponding to the gradation difference during the preliminary drive period TS1 from a difference (128−0=128) between a gradation of the display data in the previous drive and the gradation of a current drive. For example, the larger the gradation difference is, the larger drive capability is set. In addition, the control circuit 30 calculates drive capability according to a target voltage (voltage corresponding to the gradation 128). For example, in a case where a voltage change of the data signal DS1 is positive, the more the target voltage is close to the high potential side power supply voltage VDD (the more the gradation is close to a maximum gradation), the larger drive capability is set. In a case where the voltage change of the data signal DS1 is positive, the control circuit 30 turns on or off the P-type transistors TP1 to TP9 of the drive assistance circuit 14 such that the transistors have the calculated drive capability. The N-type transistors TN1 to TN9 are turned off.

In a case where the gradation is changed from 128 to 64, the drive assistance circuit 14 changes the data signal DS1 from a voltage corresponding to the gradation 128 to a voltage (that is, the low potential side power supply voltage VSS Side) corresponding to the gradation 64, during the preliminary drive period TS2. During an amplification drive period TA2 after the preliminary drive period TS2, the amplification circuit 12 outputs the voltage corresponding to the gradation 64 to the output terminal TQ1.

In this case, since the gradation difference is smaller (128−64=64) than the gradation difference during the preliminary drive period TS1, the capability decreases in terms of the drive capability according to the gradation difference. In addition, since the voltage change of the data signal DS1 is negative, the more the target voltage is close to the low potential side power supply voltage VSS (the more the gradation is close to a minimum gradation), the larger drive capability is set. In a case where the voltage change of the data signal DS1 is negative, the control circuit 30 turns on or off the N-type transistors TN1 to TN9 of the drive assistance circuit 14 such that the transistors have the calculated drive capability. The P-type transistors TP1 to TP9 are turned off.

In a case where a voltage reached by the preliminary drive of the drive assistance circuit 14 is shifted from a target voltage (voltage corresponding to the gradation 128 or the gradation 64), the voltage is corrected by drive of the amplification circuit 12. However, if the correction is large, a large drive capability is required for the amplification circuit 12, and power consumption increases. During the preliminary drive of the drive assistance circuit 14, the parasitic capacitance of the data line or a pixel capacitance is charged by a current flowing through the transistor. At this time, if the charged capacitance values are different from each other, the required drive capabilities also are different from each other. That is, if the parasitic capacitances between the data lines are different in each data line, the required drive capability is also different with respect to the same voltage change. In the present embodiment, the capacitance between the data lines can be adjusted by the capacitance circuit, and thereby, the capacitance which is charged by the preliminary drive can be made to be the same in each data line. Accordingly, it is possible to perform the preliminary drive with the same drive capability with respect to the same voltage change. Thereby, it is possible to reduce an error between the voltage reached by the preliminary drive and the target voltage, and to reduce the power consumption of the amplification circuit 12. In addition, there is no need to change calculation of drive capability for each data line, and the calculation of the drive capability can be simplified.

FIG. 16 illustrates a second detailed configuration example of the drive circuit 10. The drive circuit 10 of FIG. 16 includes the amplification circuit 12, a capacitor circuit 16, and a capacitor drive circuit 18. The capacitor circuit 16 includes first to mth capacitors C1 to Cm (m is an integer of 2 or more), and the first to mth capacitors C1 to Cm are provided in correspondence with the output terminal TQ1 and are provided between the output terminal TQ1 and first to mth capacitor drive nodes NDR1 to NDRm. The capacitor drive circuit 18 outputs first to mth capacitor drive voltages corresponding to the display data GD[m:1] (gradation data) to the first to mth capacitor drive nodes NDR1 to NDRm. In the following description, a case where m=10 will be described as an example, and m is not limited to 10. In addition, in the following description, the amplification circuit 12, the capacitor circuit 16, and the capacitor drive circuit 18 provided in correspondence with the output terminal TQ1 are described, but the same amplification circuit, capacitor circuit, and capacitor drive circuit are provided in correspondence with each of plurality of output terminals TQ1 to TQn.

One terminal of a capacitor Cq (q is an integer of 1 or more and m is an integer of 10 or less) is connected to a capacitor drive node NDRq, and the other terminal of a capacitor Cq is connected to a node NVQ of the output terminal TQ1. The capacitors C1 to C10 have capacitance values weighted by binary numbers (power of 2). That is, the capacitance value of the capacitor Cq is $2^{(q-1)} \times C1$.

The capacitor drive circuit 18 includes first to tenth drive units DR1 to DR10 that output first to tenth capacitor drive voltages. The qth bit GDq of display data GD[10:1] is input to an input node of the drive unit DRq. An output node of the drive unit DRq is a capacitor drive node NDRq. The display data GD[10:1] is configured with first to tenth bits GD1 to GD10 (first to nth bits), the bit GD1 corresponds to an LSB, and the bit GD 10 corresponds to an MSB.

The drive unit DRq outputs a first voltage level in a case where the bit GDq is at a first logic level and outputs a second voltage level in a case where the bit GDq is at a second logic level. For example, the first logic level is "0" (low level), the second logic level is "1" (high level), the first voltage level is a low potential side power supply voltage VSS, and the second voltage level is a high potential side power supply voltage VDD.

As described above, capacitance values of the capacitors C1 to C10 are weighted by power of 2 according to digits of the bits GD1 to GD10 of the display data GD[10:1]. Then, the drive units DR1 to DR10 output VSS or VDD according to the bits GD1 to GD10, and thereby, the capacitors C1 to C10 are driven by the voltages. Charge redistribution occurs between the capacitors C1 to C10 and the electro-optical panel side capacitance CX by the drive, and as a result, the data voltage (data signal DS1) is output to the output terminal TQ1.

The electro-optical panel side capacitance CX is a sum of capacitances viewed from the output terminal TQ1. For example, the electro-optical panel side capacitance CX is obtained by adding a substrate capacitance CX1 which is a parasitic capacitance of a printed circuit substrate and a panel capacitance CX2 which is a parasitic capacitance or a pixel capacitance in the electro-optical panel 200. A capacitance CO (sum of capacitance values of the capacitors C1 to C10) of the capacitor circuit 16 is set such that CO:CX is a predetermined ratio (for example, 1:2).

Hereinafter, an operation of the drive circuit 10 will be described. First, the drive circuit 10 initializes a voltage of the output terminal TQ1 to a common voltage (initial voltage). Next, during the preliminary drive period, the control circuit 30 outputs the display data GD[10:1] to the capacitor drive circuit 18, and the capacitor drive circuit 18 outputs a capacitor drive voltage corresponding to the display data GD[10:1] to the capacitor circuit 16. A voltage based on the common voltage is output to the output terminal TQ1 by charge redistribution. For example, in a case where CO:CX=1:2, the data signal DS1 ranges from the common voltage to VDD/3. During an amplification drive period after the preliminary drive period, the amplification circuit 12 amplifies an output voltage VIN of a D/A conversion circuit (D/A conversion circuit 40 of FIG. 17) and outputs the amplified voltage to the output terminal TQ1. The voltage VIN is obtained by performing D/A conversion of the display data GD[10:1] by using the D/A conversion circuit.

Since the drive circuit 10 of FIG. 16 uses the charge redistribution between the capacitances during the preliminary drive, if the electro-optical panel side capacitances CX are different from each other in each data line, the voltages obtained by the charge redistribution are also different from each other. The error is corrected by driving the amplification circuit 12, but if the correction is large, a large drive capability is required for the amplification circuit 12, and power consumption increases. In the present embodiment, the capacitance between the data lines can be adjusted by the capacitance circuit, and thereby, the electro-optical panel side capacitance CX can be made to be the same in each data line. Accordingly, the error between the voltage reached by the preliminary drive and the target voltage can be reduced, and the power consumption of the amplification circuit 12 can be reduced.

The drive circuit 10 may further include a variable capacitance circuit provided between each output terminal and a reference voltage node. A capacitance of the variable capacitance circuit is set such that a capacitance value obtained by adding the capacitance value of the variable capacitance circuit to the capacitance value of the electro-optical panel side capacitance, and the capacitance value of the capacitor circuit 16 have a given capacitance ratio relationship. That is, the substrate capacitance CX1 and the panel capacitance CX2 are different from each other depending on a design of the substrate or a type (product) of the electro-optical panel 200, and thereby, the voltage obtained by the charge redistribution varies. The variable capacitance circuit adjusts the capacitance ratio such that the variation is not generated. That is, in a case where the capacitance value of the variable capacitance circuit is referred to as CAD, the CAD is set such that CO:(CAD+CX) is a predetermined capacitance ratio (for example, 1:2).

A case where the drive circuit 10 includes the amplification circuit 12 is described with reference to FIG. 16, the invention is not limited to this, and the amplification circuit 12 may be omitted. In this case, the electro-optical panel 200 is driven only by the charge redistribution of the capacitor circuit 16.

6. Electro-Optical Device

FIG. 17 illustrates a configuration example of the electro-optical device 400 (display device) including the display driver 100 according to this embodiment. The electro-optical device 400 includes the display driver 100 and the electro-optical panel 200. The display driver 100 includes the drive circuit 10, the measurement circuit 20, the control circuit 30, the D/A conversion circuit 40, the voltage generation circuit 50, a storage unit 60 (memory), an interface circuit 70, and a capacitance circuit 80. The electro-optical panel 200 includes a pixel array 210 and a sample hold circuit 220. The capacitance circuit 80 corresponds to the capacitance circuits CC1 to CCn of FIG. 1 and the like. The pixel array 210 formed by arranging a plurality of pixels of FIG. 2 in an array. The sample hold circuit 220 corresponds to the transistors TR1, TR2, TR3, ... of FIG. 2.

Figure 18:
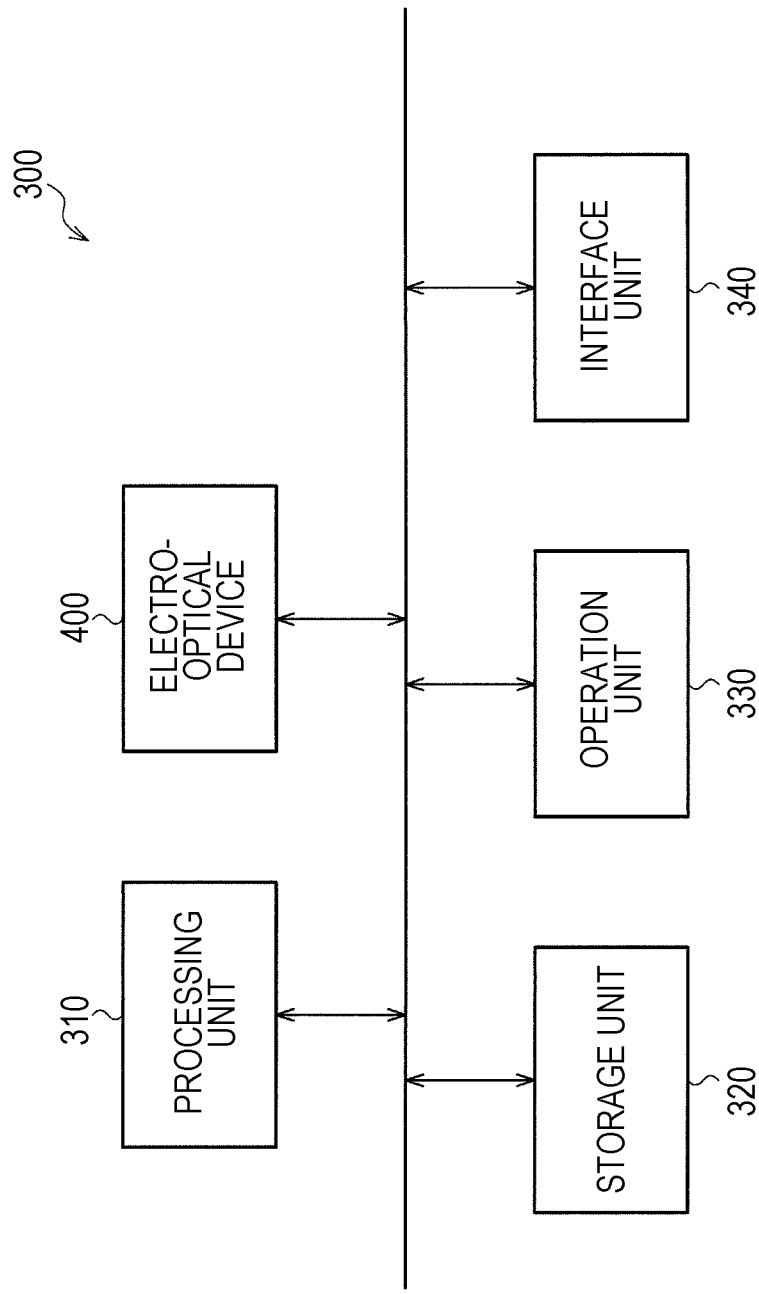
FIG. 18 is a configuration example of an electronic apparatus.

The interface circuit 70 performs communication between the display driver 100 and an external processing device (for example, a processing unit 310 of FIG. 18). For example, a clock signal or display data is input from the external processing device to the control circuit 30 through the interface circuit 70.

The control circuit 30 controls each unit of the display driver 100 on the basis of the clock signal or the display data input through the interface circuit 70. For example, the control circuit 30 selects horizontal scan lines of the pixel array 210 or controls display timing of vertical synchronization control and the like of the pixel array 210, and controls the drive circuit 10 in accordance with the display timing.

The voltage generation circuit 50 generates various voltages and outputs the voltages to the drive circuit 10 or the D/A conversion circuit 40. For example, the voltage generation circuit 50 includes a gradation voltage generation circuit (for example, ladder resistors) which generates a plurality of voltages, a power supply circuit which generates power supply of an amplification circuit of the drive circuit 10, a voltage generation circuit which generates the determination voltage VR of the measurement circuit 20, and the like.

The D/A conversion circuit 40 performs D/A conversion of the display data from the control circuit 30, and outputs the converted voltage to the drive circuit 10. That is, a voltage corresponding to the display data is selected among a plurality of voltages supplied from the gradation voltage generation circuit of the voltage generation circuit 50, and the selected voltage is output to the drive circuit 10.

The storage unit 60 stores various types of data (for example, setting data) and the like used for controlling the display driver 100. For example, the storage unit 60 is configured with a nonvolatile memory or RAM (SRAM, DRAM, and the like).

7. Electronic Apparatus

FIG. 18 is a configuration example of an electronic apparatus 300 including the display driver 100 according to the embodiment. There may be various types of electronic apparatuses in which display devices are mounted, such as a projector or a head mount display, a portable information terminal, an in-vehicle device (for example, a meter panel, a car navigation system, and the like), a portable game terminal, and an information processing device, as a specific example of the electronic apparatus 300.

The electronic apparatus 300 includes a processing unit 310 (for example, a processor such as a CPU, or a gate array), a storage unit 320 (for example, a memory, a hard disk, or the like), an operation unit 330 (an operation device), an interface unit 340 (an interface circuit or an interface device), and the electro-optical device 400 (display). The electro-optical device 400 includes the display driver 100 and the electro-optical panel 200 as illustrated in FIG. 17.

The operation unit 330 is a user interface that receives various operations from a user. For example, the operation unit includes buttons, a mouse, a keyboard, a touch panel mounted on the electro-optical device 400 (electro-optical panel 200), and the like. The interface unit 340 is a data interface which receives and outputs image data or control data. For example, the interface unit includes a wired communication interface such as a USB, or a wireless communication interface such as a wireless LAN. The storage unit 320 stores data input from the interface unit 340. Alternatively, the storage unit 320 functions as a working memory of the processing unit 310. The processing unit 310 processes display data input from the interface unit 340 or stored in the storage unit 320, and transfers the processed display data to the electro-optical device 400 (display driver 100). The electro-optical device 400 displays an image on a pixel array on the basis of the display data transferred from the processing unit 310.

The present embodiment is described in detail as above, and it will be easily understood by those skilled in the art that many modifications can be made without practically departing from novel matters and effects of the invention. Hence, all the modifications are included in the scope of the invention. For example, a term described together with another term that is broader or equivalent at least once in the specification or drawings, can be replaced with a term different from the term at any position of the specification or the drawings. In addition, all combinations of the present embodiment and modification examples are also included in the scope of the invention. In addition, configurations and operations of the display driver, the electro-optical panel, the electro-optical device, the electronic apparatus, and the like are not limited to the description of the present embodiment, and various modifications can be made.

The entire disclosure of Japanese Patent Application No. 2016-157241, filed Aug. 10, 2016 is expressly incorporated by reference herein.

What is claimed is:

1. A display driver that outputs a data voltage according to display data for an electro-optical panel, the display driver comprising:
    a first drive circuit that outputs a first data voltage in accordance with first display data;
    a second drive circuit that outputs a second data voltage in accordance with second display data;
    a first output terminal that is electrically connected to a first data line of the electro-optical panel and outputs the first data voltage;
    a second output terminal that is electrically connected to a second data line of the electro-optical panel which is adjacent to the first data line and outputs the second data voltage;
    a variable capacitance circuit that is provided between the first output terminal and the second output terminal; and
    a control circuit that sets a capacitance value of the variable capacitance circuit.

2. The display driver according to claim 1, wherein
the variable capacitance circuit includes
    a first capacitor,
    a second capacitor,
    a first switch that electrically connects the first capacitor to a first connection point between the first output terminal and the second output terminal, and
    a second switch that electrically connects the second capacitor to a second connection point between the first output terminal and the second output terminal.

3. The display driver according to claim 1, further comprising:
    a third drive circuit that outputs a third data voltage in accordance with third display data; and
    a third output terminal that is electrically connected to a third data line adjacent to the second data line of the electro-optical panel and outputs the third data voltage.

4. The display driver according to claim 3, wherein
the variable capacitance circuit further includes
    a third capacitor,
    a fourth capacitor,
    a third switch that electrically connects the third capacitor to a node between the second output terminal and the third output terminal, and
    a fourth switch that electrically connects the fourth capacitor to a node between the second output terminal and the third output terminal.

5. The display driver according to claim 4, wherein capacitance values of the first capacitor and the second capacitor are weighted by binary numbers.

6. The display driver according to claim 1, wherein the control circuit includes a register that stores capacitance value setting information for setting the capacitance value of the variable capacitance circuit.

7. The display driver according to claim 1, further comprising:
    a measurement circuit that measures capacitance value information between the first data line and the second data line of the electro-optical panel, wherein
    the control circuit sets the capacitance value of the variable capacitance circuit on the basis of the capacitance value information which is measured by the measurement circuit.

8. The display driver according to claim 7, wherein the measurement circuit includes a comparison circuit that compares a reference voltage with the first data voltage which is output from the first output terminal and compares the reference voltage with the second data voltage which is output from the second output terminal.

9. The display driver according to claim 8, wherein the comparison circuit sequentially performs comparison of the reference voltage and the first data voltage and comparison of the reference voltage and the second data voltage.

10. The display driver according to claim 1, wherein
the first drive circuit includes a first amplification circuit that is provided in correspondence with the first output terminal, and a drive assistance circuit that assists drive which is performed by the first amplification circuit, and
the drive assistance circuit performs preliminary drive on a basis of gradation change information of the display data.

11. The display driver according to claim 1, wherein
the first drive circuit includes
a first drive capacitor that is provided in correspondence with the first output terminal and is provided between the first output terminal and a first capacitor drive node, and
a capacitor drive circuit that outputs a first capacitor drive voltage corresponding to the first display data to the first capacitor drive node.

12. The display driver according to claim 1, wherein
the electro-optical panel includes a first sample hold circuit that samples and holds the first data voltage, and a second sample hold circuit that samples and holds the second data voltage,
the first output terminal is electrically connected the first sample hold circuit, and
the second output terminal is electrically connected the second sample hold circuit.

13. An electro-optical device comprising:
the display driver according to claim 1; and
an electro-optical panel.

14. The display driver according to claim 12, wherein
the first sample hold circuit includes a first transistor having a source and a drain that are sequentially arranged in a first direction of the electro-optical panel, and
the second sample hold circuit includes a second transistor having a drain and a source that are sequentially arranged.

15. An electronic apparatus comprising:
the display driver according to claim 1.

* * * * *